United States Patent
Kai et al.

(10) Patent No.: US 8,215,562 B2
(45) Date of Patent: Jul. 10, 2012

(54) WIRELESS TAG

(75) Inventors: Manabu Kai, Kawasaki (JP); Teruhisa Ninomiya, Kawasaki (JP); Syunji Baba, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/960,823

(22) Filed: Dec. 6, 2010

(65) Prior Publication Data

US 2011/0155814 A1 Jun. 30, 2011

(30) Foreign Application Priority Data

Dec. 28, 2009 (JP) ................................. 2009-297917
Aug. 10, 2010 (JP) ................................. 2010-179264

(51) Int. Cl.
*G06K 19/05* (2006.01)
(52) U.S. Cl. ........................................ 235/492; 235/487
(58) Field of Classification Search .................. 235/487, 235/492, 493
See application file for complete search history.

(56) References Cited

U.S. PATENT DOCUMENTS

| 7,378,972 B2 | 5/2008 | Kai et al. |
| 2006/0028344 A1 | 2/2006 | Forster |
| 2007/0109131 A1 | 5/2007 | Kai et al. |
| 2008/0074793 A1 | 3/2008 | Sakama et al. |

FOREIGN PATENT DOCUMENTS

| EP | 1 788 513 | 5/2007 |
| EP | 1 903 570 | 3/2008 |
| JP | 2007-166573 | 6/2007 |
| KR | 10-2007-0052186 | 5/2007 |
| KR | 10-2008-0027124 | 3/2008 |
| WO | 00/23994 | 4/2000 |

OTHER PUBLICATIONS

European Search Report dated Mar. 17, 2011, from corresponding European Application No. 10 19 4650.
Korean Notice of Preliminary Rejection dated Dec. 28, 2011, from corresponding Korean Application No. 10-2010-135913.

*Primary Examiner* — Daniel St. Cyr
(74) *Attorney, Agent, or Firm* — Katten Muchin Rosenman LLP

(57) ABSTRACT

The present invention provides a wireless tag to be attached onto a disc-shaped recording medium including first and second regions. The first region, made of a nonconductive member, is disposed on the inner radial part of the recording medium, whereas the second region, including a conductive member, is disposed on the outer radial part of the recording medium. The wireless tag includes: a feed section connected to a wireless IC chip; a conductive plate including a slot therein; and a slot antenna for receiving power from the feed section. The conductive plate is formed for at least partially overlapping with the second region when the wireless tag is attached onto the inner radial part of the recording medium. The slot has a length set for obtaining an inductance enough to cause a resonance between the slot antenna and the wireless IC chip at a predetermined wireless frequency.

9 Claims, 20 Drawing Sheets

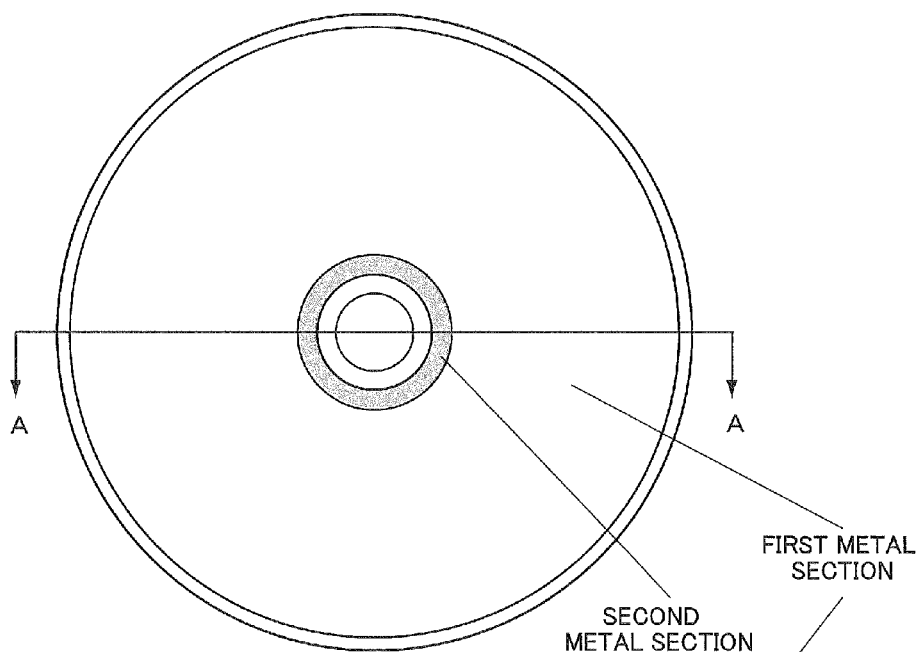
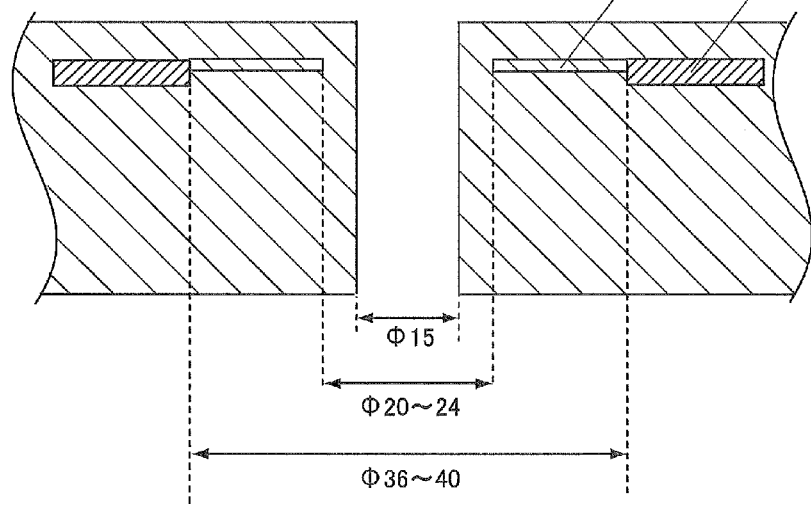
FIG.2

PLAN VIEW
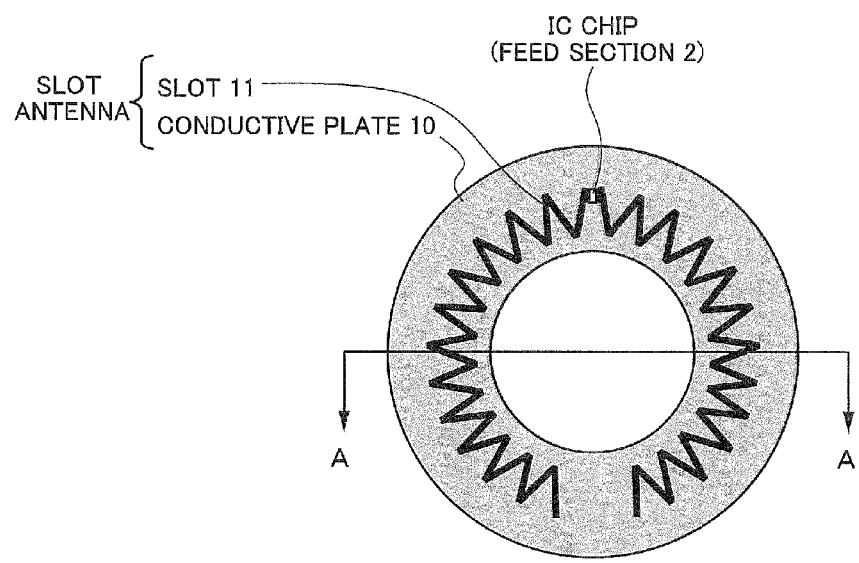
CROSS-SECTIONAL VIEW ALONG LINE A-A
(ENLARGED VIEW)
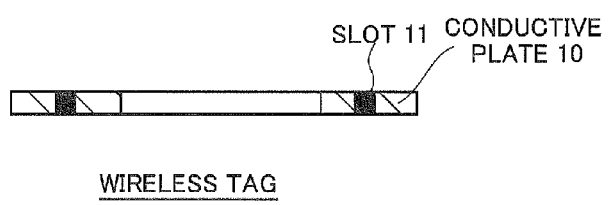
WIRELESS TAG
FIG.3

COMPUTATION RESULTS BY ELECTROMAGNETIC FIELD SIMULATOR

COMPUTATION RESULTS BY ELECTROMAGNETIC FIELD SIMULATOR

COMPUTATION RESULTS BY ELECTROMAGNETIC FIELD SIMULATOR

COMPUTATION RESULTS BY ELECTROMAGNETIC FIELD SIMULATOR

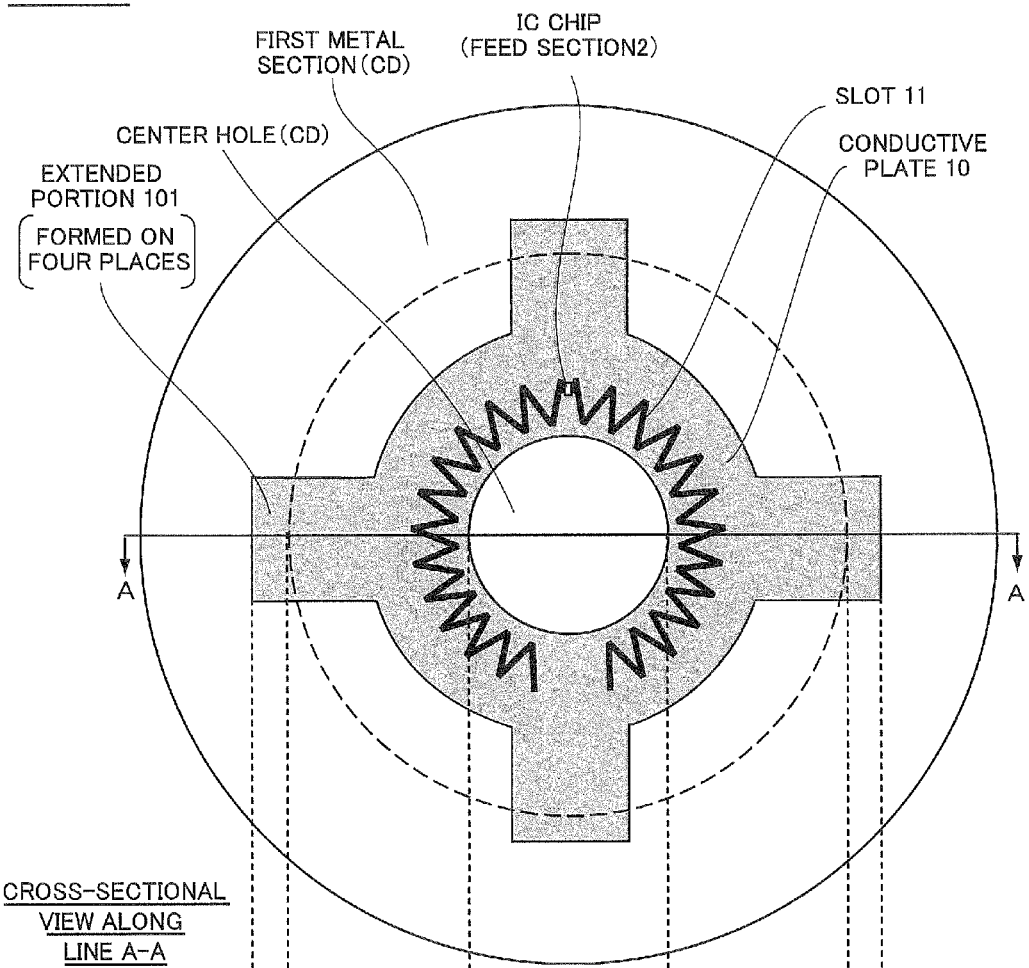
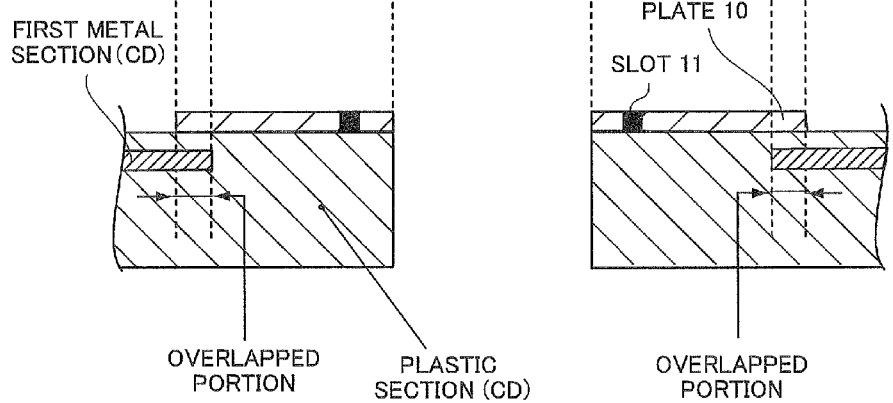
FIG.9

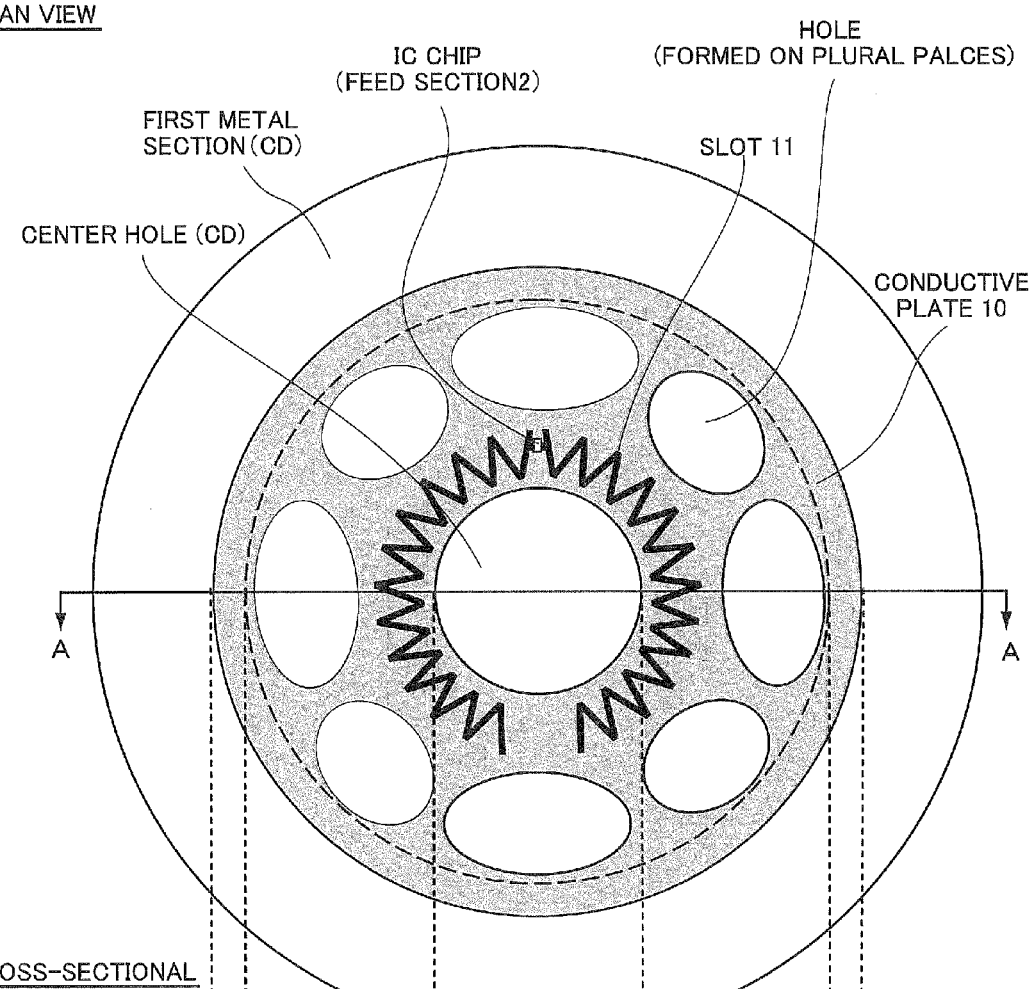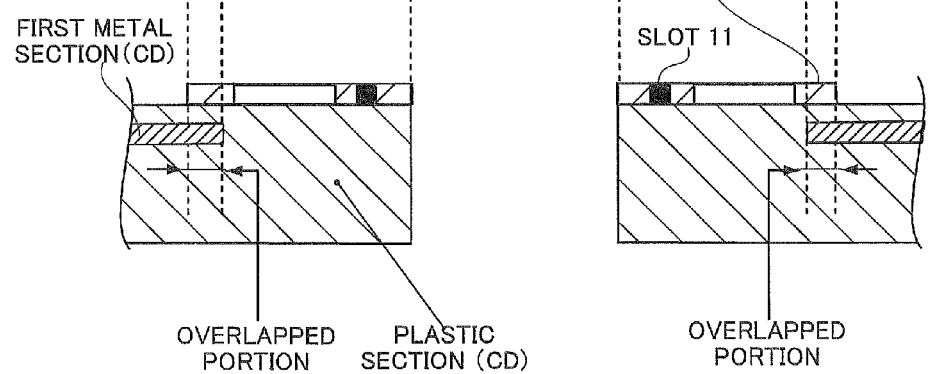
FIG.11

PLAN VIEW
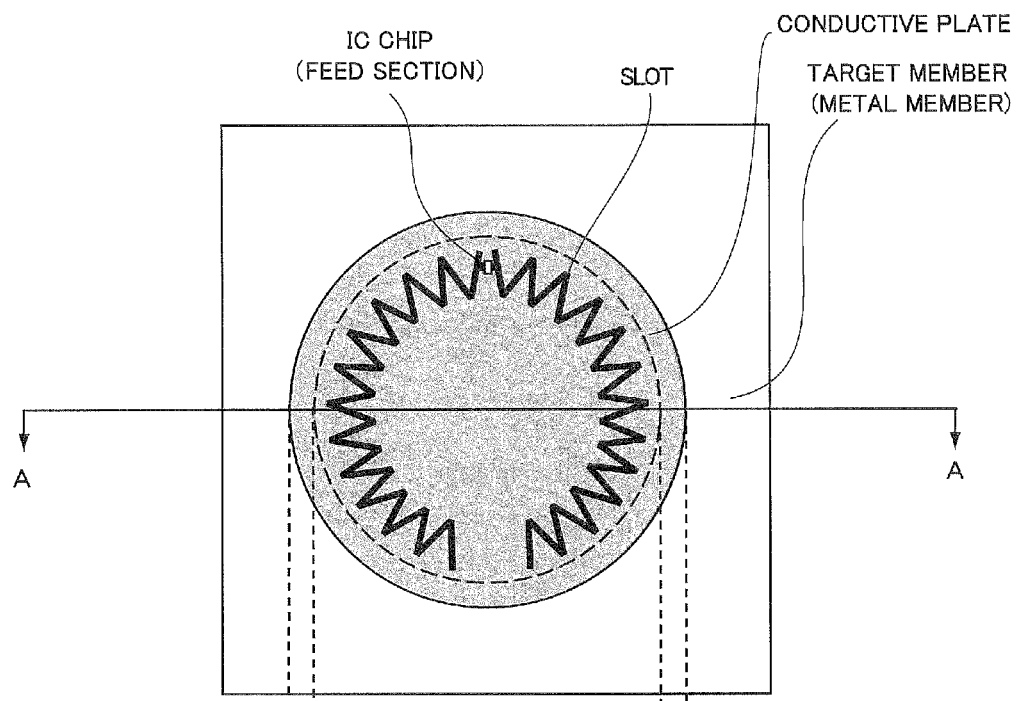
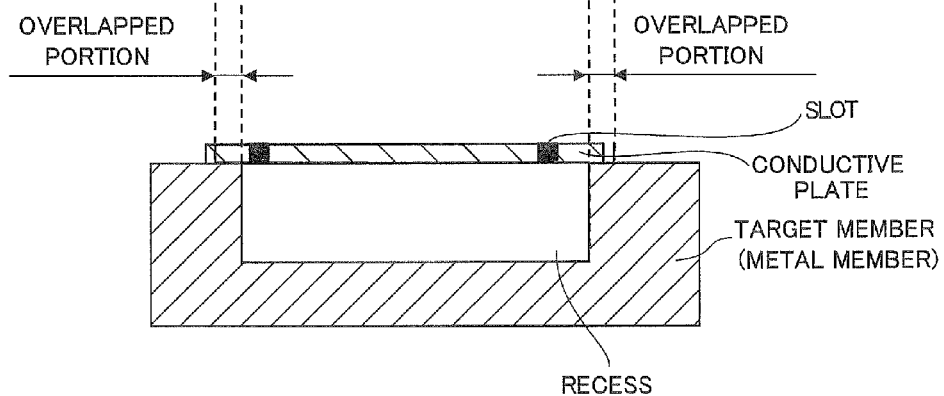
FIG.16

WIRELESS TAG

CROSS-REFERENCE TO RELATED APPLICATIONS

This application is based upon and claims the benefit of priority of the prior Japanese Patent Applications No. 2009-297917 filed on 28 Dec., 2009 and No. 2010-179264 filed on 10 Aug., 2010, the entire contents of which are incorporated herein by reference.

FIELD

The present invention relates to antenna technology of a wireless tag configured to send/receive data to/from a reader/writer in a noncontact manner.

BACKGROUND

The RFID systems have already been prevailed. A single RFID system allows a reader/writer to read information stored in a wireless tag. Specifically, the reader/writer is configured to transmit roughly 1 W signals using a wireless line of the UHF band (of 860-960 MHz), whereas the wireless tag is configured to receive the signals and send response signals back to the reader/writer. The wireless frequency band, used in Japan, ranges from 952 MHz to 954 MHz. Read range is herein roughly 3-10 m, although depending on: the antenna gain of a wireless tag; the operating voltage of a wireless IC chip; the antenna gain of a reader/writer; and the surrounding environment.

The wireless tag includes an antenna and a wireless IC chip (of a square type having roughly 0.5 mm sides) to be connected to a power supply contact of the antenna.

In the wireless tag, an antenna pattern is formed on a translucent film sheet by means of printing, etching and the like. The wireless IC chip is connected to the power supply contact of the antenna although no special matching circuit is mounted on the power supply contact.

As illustrated in FIG. 1, a wireless IC chip (hereinafter simply referred to as "an IC chip") is allowed to be equivalently expressed with a parallel circuit having an internal resistor Rc (of e.g., 1700Ω) and a capacitance Cc (of e.g., 1.0 pF). Further, an antenna is allowed to be equivalently expressed with a parallel circuit having a radial resistor Ra (of e.g., 2000Ω) and an inductance La (of e.g., 30 nH). When the IC chip and the antenna are connected in parallel, resonance occurs between the capacitance Cc and the inductance La and impedances are accordingly matched at a desired resonance frequency fo (of e.g., 953 MHz). Accordingly, electric power received by the antenna is maximally provided to the IC chip. It is herein noted that the aforementioned resonance frequency fo is expressed by "$1/(2\pi*(La*Cc)^{1/2})$".

When wireless tags are attached onto nonconductive members (or nonmetal members) such as cardboard members or plastic members, the dipole antennas are often used as the wireless-tag antennas. A single dipole antenna may include a meander-shaped dipole section, and the entire length thereof may be roughly 140 mm corresponding to $\lambda/2$. In this case, a single wireless tag may have a size of 10 cm by 2 cm.

When being attached onto a given disc-shaped recording medium (CD, DVD, etc), the wireless tag with the size of roughly 10 cm by 2 cm overlaps an annular metal section for a data recording purpose (hereinafter referred to as "a first metal section") of the recording medium in a plan view. Specifically, the annular first metal section of the recording medium has an inner radius of ø36-40 mm and an outer radius of roughly 120 mm (roughly equal to the outer diameter of the entire recording media). Therefore, the wireless tag of the size of 10 cm by 2 cm overlaps the first metal section when being attached onto the recording medium. Under the condition, wireless communication is completely blocked between the wireless tag and the reader/writer by means of a shield effect of the first metal section.

In view of the above, Japan Laid-open Patent Application Publication No. JP-A-2007-166573 proposes a wireless tag preferable for attachment onto a disc-shaped recording medium (CD, DVD, etc.). The wireless tag is configured to be attached onto a disc-shaped recording medium while a monopole antenna thereof is disposed on a nonconductive member (specifically, a translucent plastic section) arranged on the inner radial part of the recording medium. Further, electromagnetic coupling is configured to occur between the wireless tag and a first metal section of the recording medium when an annular flat ground section of the wireless tag partially overlaps the first metal section of the recording medium in a plan view. With the configuration, the first metal section of the recording medium is allowed to be assumed as a ground at a high frequency. Therefore, wireless communication is fully executable between the wireless tag and a reader/writer.

In the aforementioned wireless tag of the type proposed so far, the disc-shaped recording medium is assumed to include the first metal section having an inner diameter of ø36-40 mm. Further, a monopole antenna is assumed to be formed within the first metal section of the above range. However, the disc-shaped recording media of another type have been introduced in the market in these years. A single recording medium of the type includes a metal section for a non-data-recording purpose (hereinafter referred to as "a second metal section") disposed radially inwards of the first metal section. It is confirmed that the inner diameter of the second metal section ranges from ø20 mm to ø27 mm. FIG. 2 illustrates the structure of a disc-shaped recording medium including a first metal section and a second metal section.

Such a recording medium, including a metal section with a small inner diameter, is allowed to include a narrow region made of only a nonconductive member on the inner radial part thereof. Therefore, it is difficult to mount a monopole antenna thereon. When being formed in the narrow annular region, for instance, a monopole antenna of a well-known type is assumed to include a double-circled/triple-circled monopole section within the narrow annular region. Alternatively, the monopole antenna is assumed to include a meander-shaped monopole section having a narrow line width within the narrow annular region. In the aforementioned monopole-antenna forming method, however, significant reduction in read range is unavoidable between the monopole antenna and the reader/writer.

SUMMARY

According to an aspect of the present invention, a wireless tag is configured to be attached onto a disc-shaped recording medium including a first region and a second region. The first region is made of a nonconductive member, whereas the second region includes a conductive member. The first region is disposed on an inner radial part of the recording medium, whereas the second region is disposed on an outer radial part of the recording medium.

The wireless tag includes:
(A) a feed section configured to be connected to a wireless IC chip; and
(B) a slot antenna, including a conductive plate having a slot, configured to receive power from the feed section.

The conductive plate is formed for at least partially overlapping the second region of the recording medium when the wireless tag is attached onto the inner radial part of the recording medium. Further, the slot has a length set for obtaining an inductance enough to cause a resonance between the slot antenna and the wireless IC chip at a predetermined wireless frequency.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

Referring now to the attached drawings which form a part of this original disclosure:

FIG. 2 is a plan view of a structure of a disc-shaped recording medium including a first metal section and a second metal section, together with a cross-sectional view of the structure of the disc-shaped recording medium, sectioned along a line A-A;

FIG. 3 is a plan view of a structure of a wireless tag, together with a cross-sectional view of the structure of the wireless tag according to the first exemplary embodiment, sectioned along a line A-A;

FIG. 9 is a plan view of an exemplary structure of a wireless tag in relation to a dimension of a CD, together with a cross-sectional view of the exemplary structure of the wireless tag according to the third exemplary embodiment in relation to the dimension of the CD, sectioned along a line A-A;

FIG. 11 is a plan view of an exemplary structure of a wireless tag in relation to a dimension of a CD, together with a cross-sectional view of the exemplary structure of the wireless tag according to the fifth exemplary embodiment in relation to the dimension of the CD, sectioned along a line A-A;

FIG. 16 is a plan view of an exemplary structure of a wireless tag, together with a cross-sectional view of the exemplary structure of the wireless tag according to the tenth exemplary embodiment, sectioned along a line A-A;

DESCRIPTION OF EMBODIMENT(S)

A wireless tag according to an exemplary embodiment will be hereinafter explained. It is herein noted that unit of diameter is set to be millimeter [mm] unless specified otherwise.

(1) First Exemplary Embodiment

FIG. 3 illustrate the structure of a wireless tag according to a first exemplary embodiment of the present invention. In the wireless tag, a slot antenna is obtained by forming a slot 11 (i.e., groove) on an annular (i.e., doughnut-shaped) conductive plate 10. The slot 11 is extended from a feed section 2 to the both lateral directions. The slot 11 is entirely formed in a circular-arc meander shape. The conductive plate 10 is a conductive material made of one of the group of Cu, Au and Al, for instance. The feed section 2 is formed in roughly the center of the meander-shaped slot 11 for disposing an IC chip therein. The IC chip is implanted into the conductive plate 10.

Figure 1:
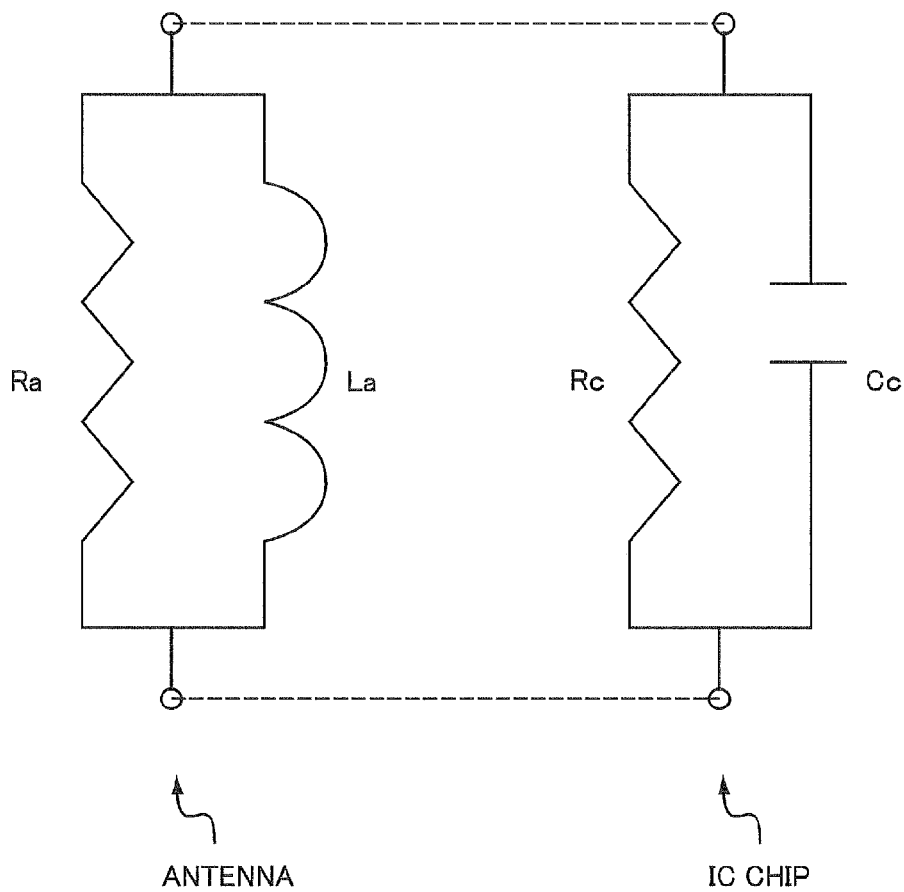
FIG. 1 is a circuit diagram regarding an internal equivalent circuit of a wireless tag.

The slot antenna is normally reversible with respect to the monopole antenna. Specifically, the monopole antenna is set to have a length greater than $\lambda/2$ for having a desired inductance component (depicted with La in FIG. 1), whereas the slot antenna may be set to have a length less than $\lambda/2$ for having a desired inductance component. More specifically, as illustrated in FIG. 3, the slot length of the slot 11 from the feed section 2 to each of the distal ends thereof is set to be less than $\lambda/4$. Even if a monopole antenna is formed in a circular-arc meander shape, it is possible to set the outer diameter of the circular-arc meander-shaped slot of the slot antenna to be shorter than the outer diameter of the monopole antenna.

In the present exemplary embedment, the meander shape of the slot 11 is formed by coupling a plurality of V-shaped portions in a circular-arc shape as illustrated in FIG. 3. The following is the reason that the V-shape is adopted to the portions forming the meander shape. Electricity flows in opposite directions on a part of the conductive plate 10 disposed outwards of adjacent V-shaped portions of the slot 11. However, electricity vectors in opposite directions are herein obliquely oriented. It is thereby possible to reduce the amount of electromagnetic waves to be cancelled by electricity flowing in opposite directions. It is consequently possible to further increase the effective length of the antenna and further reduce the outer diameter of the slot 11 compared to, for instance, a meander-shaped slot formed by coupling a plurality of U-shaped portions.

Figure 4:
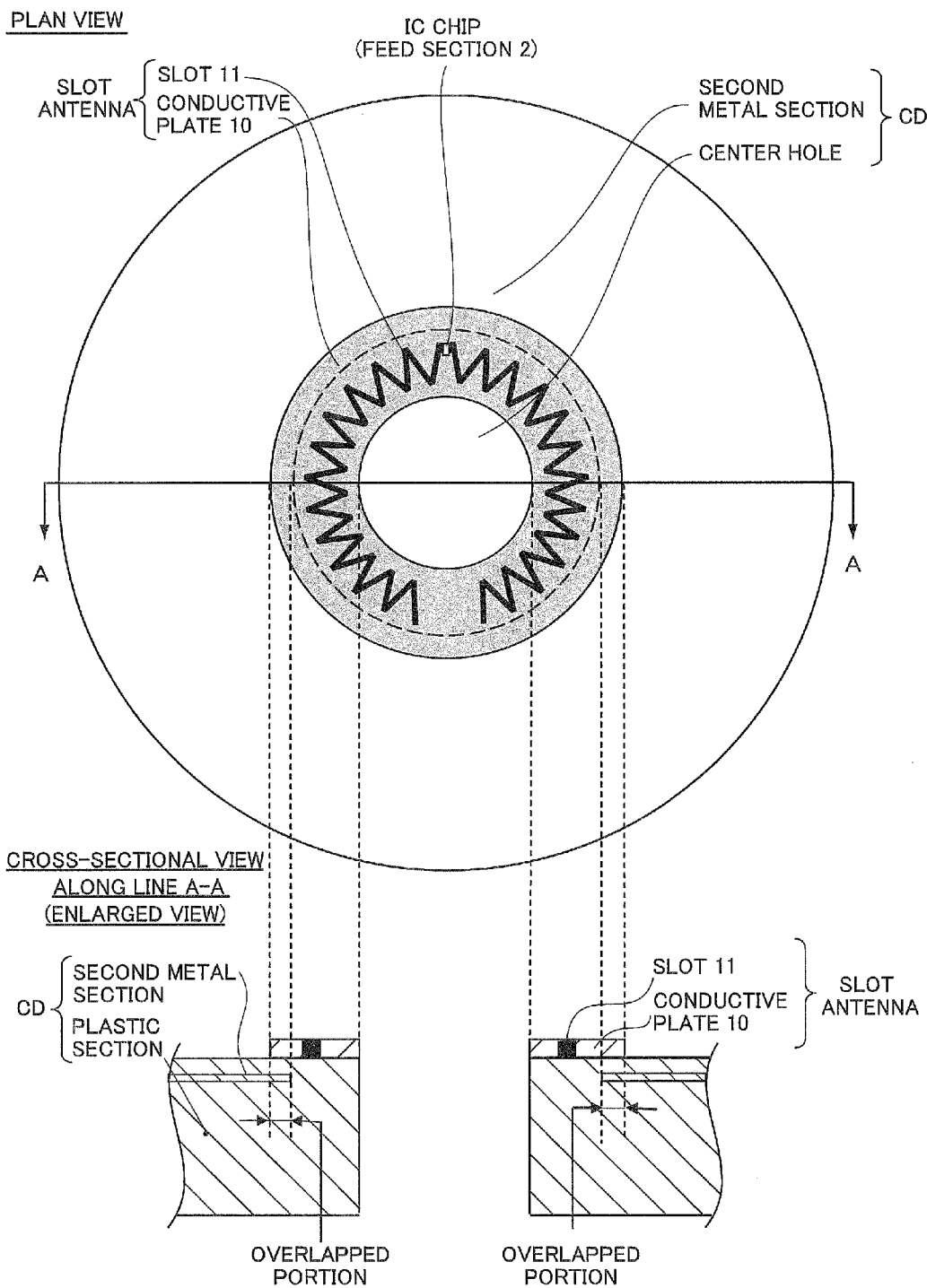
FIG. 4 is a plan view of a CD attaching the wireless tag thereon, together with a cross-sectional view of the CD attaching the wireless tag according to the first exemplary embodiment thereon, sectioned along a line A-A.

FIG. 4 illustrate the wireless tag of FIG. 3 attached onto a CD (Compact Disk) as an exemplary disc-shaped recording medium. As illustrated in FIG. 4, the wireless tag is attached onto a so-called label surface, which is a surface opposite to a readable surface of the CD. More specifically, the wireless tag is attached onto a part of the label surface surrounding the center hole formed in the radial inner part of the CD. Any suitable methods may be used for attaching the wireless tag onto the CD. For example, extremely thin double-sided tapes, adhesive materials, stickers and the like may be used for attaching the wireless tag onto the CD.

A second metal section is implanted into a plastic section of the CD as an attachment target. In the following explanation, the term "first region" refers to a region of the CD disposed radially inwards of the first/second metal section in a plan view, i.e., a radial inner region made of non-conductive member. On the other hand, the term "second region" refers to a region including a conductive material (e.g., the first metal section, the second metal section, or the like), disposed on a radial outer region of the CD in a plan view. Further, the term "metal section" will be used for inclusively referring to the first metal section and the second metal section.

As illustrated in FIG. 4B, the conductive plate 10 has an outline for at least partially overlapping with the second metal section implanted into the plastic section of the recording medium (i.e., CD) when the wireless tag is attached onto the radial inner part of the CD. In other words, the conductive plate 10 has an outer diameter greater than the inner diameter of the second region of the CD, while at least partially overlapping with the second region when the wireless tag is attached onto the CD.

Overlapping between the conductive plate 10 and the second metal section (the second region of the CD) causes electromagnetic coupling between the conductive plate 10 and the second metal section of the CD, and further between the conductive plate 10 and the first metal section (see FIG. 2) connected to the second metal section at a high frequency band. In other words, it is possible to cause the metal section of the CD to function as a part of the conductive plate 10 at a high frequency band. It is thereby possible to sufficiently emit electromagnetic waves from the slot 11. Consequently, the wireless tag of the present exemplary embodiment ensures sufficient read range from a reader/writer (not illustrated in the figure), although it is compactly formed.

Figure 5:
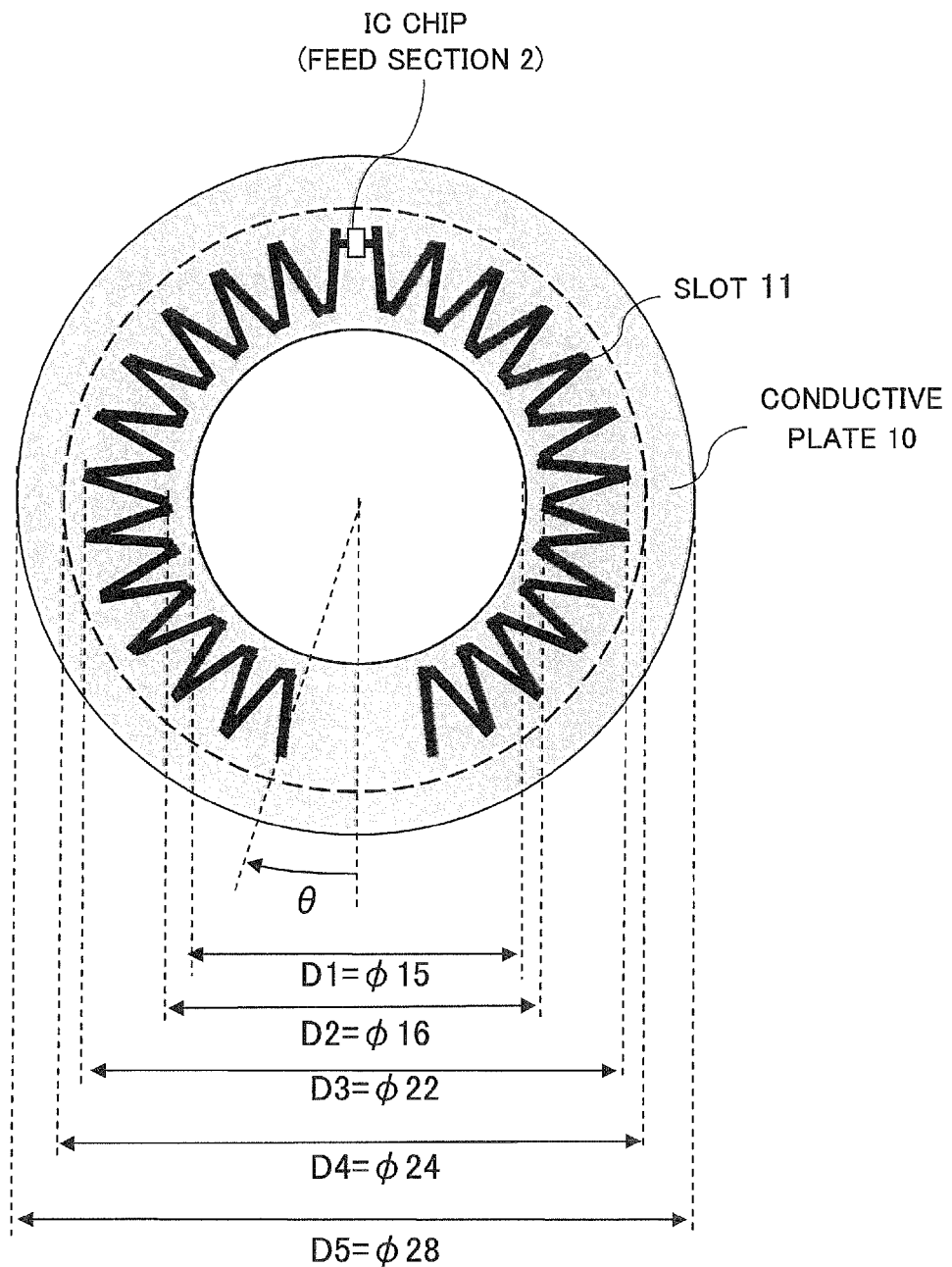
FIG. 5 is a diagram illustrating an exemplary dimension of the wireless tag according to the first exemplary embodiment in relation to a dimension of a CD.

FIG. 5 illustrates an exemplary dimension of the wireless tag in association with the dimension of a CD. In FIG. 5, a reference sign D1 is assigned to the inner diameter of the center hole of the CD. A reference sign D2 is assigned to the inner diameter of the slot formed in a circular-arc meander shape, whereas a reference sign D3 is assigned the outer diameter thereof. Further, a reference sign D4 is assigned to the inner diameter of the second metal section. Finally, a reference sign D5 is assigned to the outer diameter of the conductive plate 10. In the exemplary dimension, the conductive plate 10 has the outer diameter set for the second metal section (i.e., the second region of the CD), i.e., for establishing the relation "D4<D5". In the example illustrated in FIG. 5, D4 is set to be ø24 (D4=ø24). According to the research conducted by the inventors of the present invention, existence of a CD with D4 of ø20-27 was confirmed. Therefore, D5 is set to be greater than the possible maximum value of D4 (D4=ø27).

Further, the relation "D3≦D4" is established in the exemplary dimension represented in FIG. 5. In other words, the outer diameter of the circular-arc meander-shaped slot is set to be less than or equal to the inner diameter of the second metal section. The outer diameter of the slot, set as described, is preferable in that the second metal section does not block electromagnetic waves from the slot and sufficient read range is ensured.

Figure 6A:
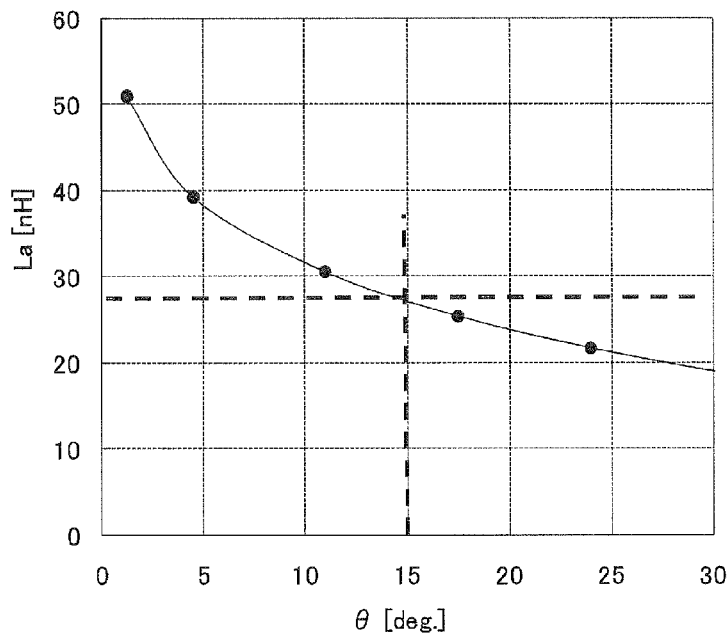
FIG. 6A is a chart representing a result of computation executed for the wireless tag according to the first exemplary embodiment by an electromagnetic field simulator.
Figure 6B:
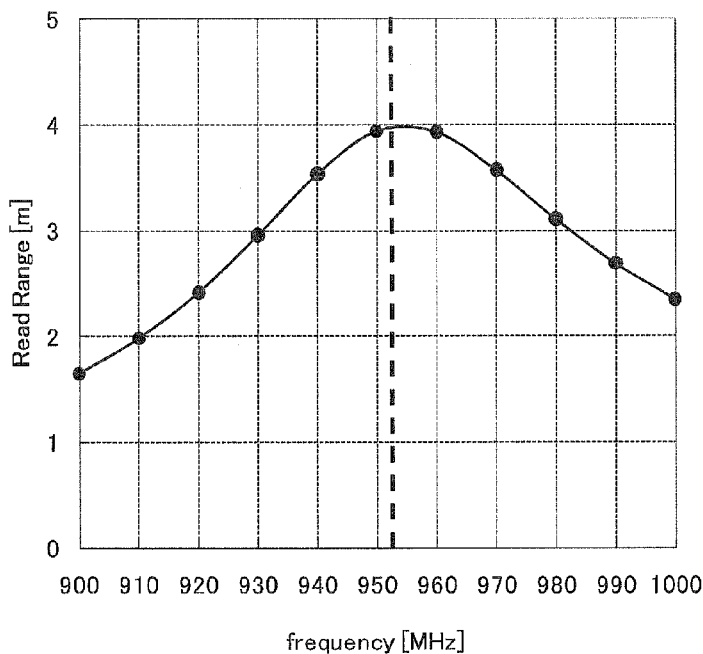
FIG. 6B is a chart representing a result of computation executed for the wireless tag according to the first exemplary embodiment by the electromagnetic field simulator.

A reference sign θ in FIG. 5 is assigned to an angle about the center of the annular wireless tag with respect to a hypothetical line connecting the center of the wireless tag and the power supply terminal. The region, enclosed within the angle θ, represents a region without the slot. Computation was executed using an electromagnetic simulator obtainable in the market based on inputs of the angle θ (of 0-30 degrees) and frequency (of 900-1000 MHz) as parameters. FIGS. 6A and 6B represent plots of the computation result. In the computation, the circuit elements on the IC chip have the following settings: Rc=1700Ω; Cc=1.0 pF (see FIG. 1 regarding Rc and Cc). FIG. 6A represents a relation between the angle θ and inductance La of the antenna, whereas FIG. 6B represents a relation between wireless frequency and read range. FIGS. 6A and 6B reveal that resonance occurs at La=27 nH where frequency to be used in the wireless tag is set to be 953 MHz (i.e., fo=953 MHz) and inductance La of 27 nH is obtainable when the degree θ is set to be 15°. In this case, sufficiently long read range (of 4 m) is achieved.

It is herein noted that electromagnetic coupling is not caused between the conductive plate 10 and the metal section of a CD at a high frequency band when the conductive plate 10 and the second metal section of a CD are prevented from overlapping with each other (i.e., D4>D5) unlike the shape of the wireless tag of the first exemplary embodiment. Accordingly, read range may be shortened to be roughly 1 m.

(2) Second Exemplary Embodiment

Figure 7:
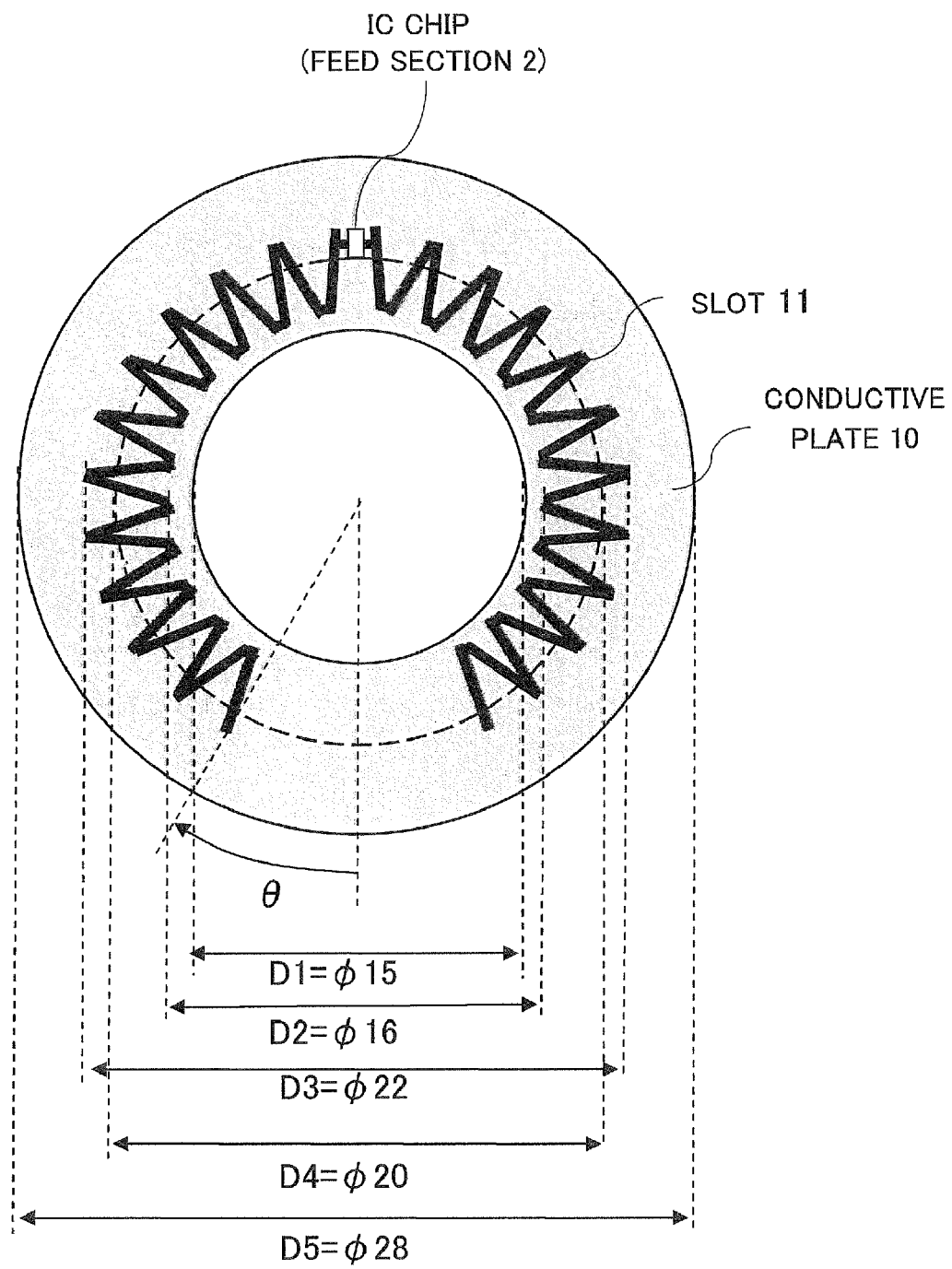
FIG. 7 is a diagram illustrating an exemplary dimension of a wireless tag according to a second exemplary embodiment in relation to a dimension of a CD.

FIG. 7 illustrates the structure of a wireless tag according to a second exemplary embodiment. The second exemplary embodiment assumes that the wireless tag is attached onto a CD including a second metal section with an inner diameter D4 different from the inner diameter of the second metal section in the assumed CD of the first exemplary embodiment. In the present exemplary embodiment, the CD as an attachment target has the inner diameter D4 of ø20 (D4=ø20), as illustrated in FIG. 7. Thus, the inner diameter D4 of the second metal section is less than the outer diameter D3 of the slot (D3>D4).

Figure 8A:
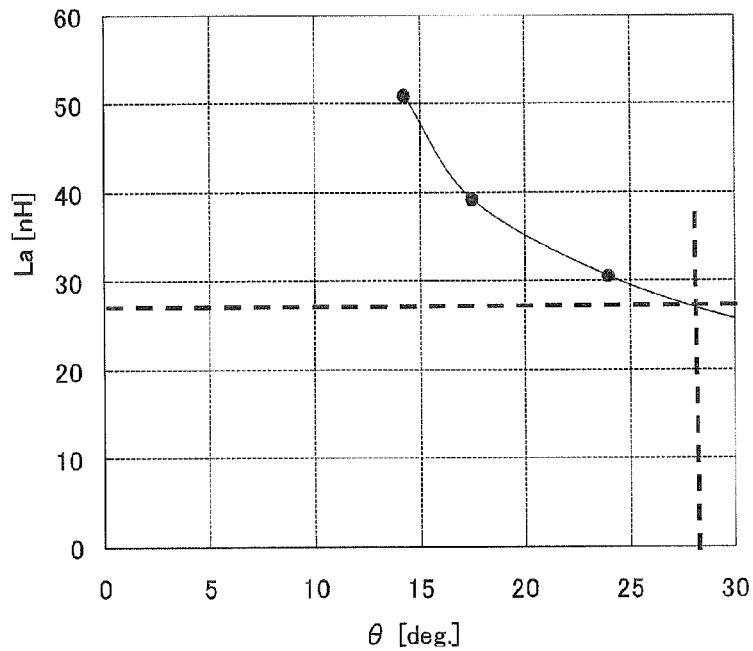
FIG. 8A is a chart representing a result of computation executed for the wireless tag according to the second exemplary embodiment by an electromagnetic field simulator.
Figure 8B:
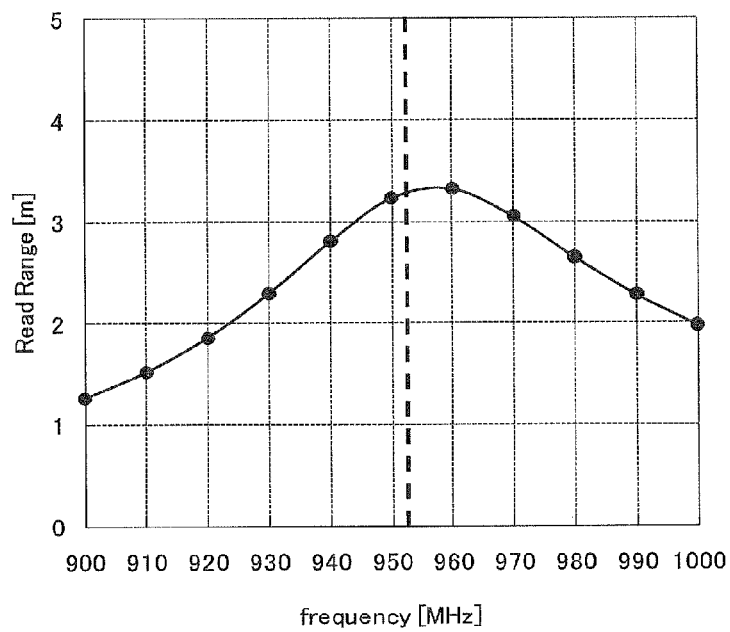
FIG. 8B is a chart representing a result of computation executed for the wireless tag according to the second exemplary embodiment by the electromagnetic field simulator.

In the present exemplary embodiment, computation was executed again using the electromagnetic simulator available in the market based on inputs of the aforementioned θ (of 0-30°) and frequency (of 900-1000 MHz) as parameters. FIGS. 8A and 8B represent plots of the computation result. In the computation, the circuit elements on the IC chip have the following settings: RC=1700Ω; and Cc=1.0 pF. Similarly to FIG. 6A, FIG. 8A represents a relation between the angle θ and inductance La of the antenna, whereas FIG. 8B represents a relation between wireless frequency and read range. FIGS. 8A and 8B reveal that resonance occurs at La=27 nH where frequency to be used in the wireless tag is set to be 953 MHz (i.e., fo=953 MHz) and inductance La of 27 nH is obtainable when the degree θ is set to be 28°. In this case, read range of 3.2 m is achieved.

In the present exemplary embodiment, read range is reduced than that of the first exemplary embodiment. However, the read range of the present exemplary embodiment is kept in a level without any negative impacts on the functions of the wireless tag. Specifically, sufficient read range is ensured by appropriately setting the shape of the slot (specifically, the aforementioned angle θ) even when the outer diameter of the slot of the slot antenna is greater than the inner diameter of the metal section of a disc-shaped recording medium as an attachment target.

In the second exemplary embodiment, the wireless tag including the slot with the angle θ of 28° is optimized for a CD including the second metal section with the inner diameter D4 of ø20. Thus, it is not preferable for the wireless tag of the second exemplary embodiment to be applied to the assumed CD of the first exemplary embodiment, i.e., a CD including the second metal section with the inner diameter D4 of ø24. This is because read range is reduced due to deterioration of a resonance condition.

(3) Third Exemplary Embodiment

In the wireless tag of the first exemplary embodiment, the conductive plate 10 has the outer diameter set for overlapping the second metal section of a CD in order to cause electromagnetic coupling between the conductive plate 10 and the metal section of the CD when the wireless tag is attached onto the CD. Further in the wireless tag of the first exemplary embodiment, the annular conductive plate 10 is formed for allowing the outer rim thereof to entirely overlap the second metal section of a CD. However, the excessive amount of metal material may be used to form an annular conductive plate for allowing the outer rim of the annular conductive plate to entirely overlap the first metal section of a CD without the second metal section (i.e., a CD only provided with the first metal section). For example, the conductive plate is manufactured by printing with Ag paste. Manufacturing cost of the wireless tag will be increased in proportion to the amount of Ag paste to be used for the conductive plate. In view of this, the wireless tag, to be attached onto a CD without the second metal section, is desired to reduce the area of the overlapped section between the conductive plate 10 and the first metal section of a CD for reducing the area of the conductive plate 10 as much as possible.

From the aforementioned point of view, FIG. 9 illustrate the structure of a wireless tag according to a third exemplary embodiment exemplified as the preferred wireless tags to be attached onto CDs without the second metal section. In the conductive plate 10 illustrated in FIG. 9, four extended portions 101 are extended from, for instance, the annular conductive plate having the outer diameter D5 described in the first exemplary embodiment. The extended portions 101 are provided for allowing the conductive plate 10 to overlap the first metal section of a CD. Sufficient read range is ensured by electromagnetic coupling between the conductive plate 10 and the first metal section of the CD when the conductive plate 10 thus at least partially overlaps with the first metal section of the CD.

(4) Fourth Exemplary Embodiment

Figure 10:
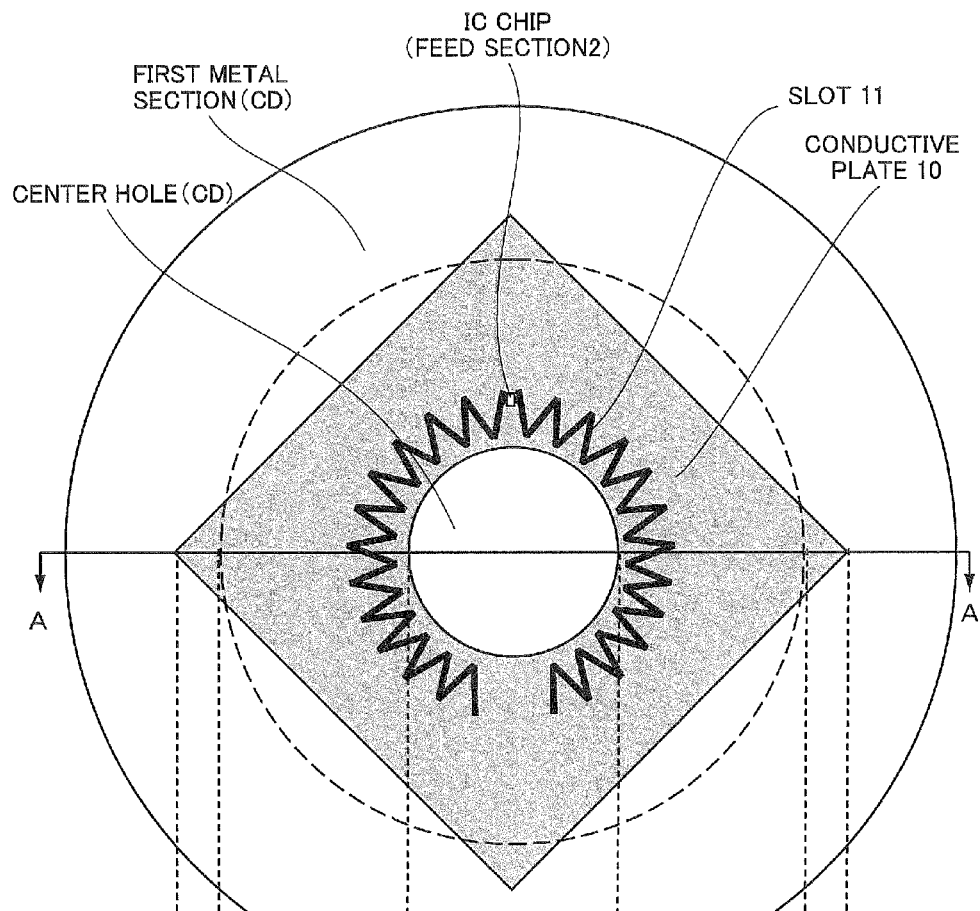
FIG. 10 is a plan view of an exemplary structure of a wireless tag in relation to a dimension of a CD, together with a cross-sectional view of the exemplary structure of the wireless tag according to the fourth exemplary embodiment in relation to the dimension of the CD, sectioned along a line A-A.

Similarly to the wireless tag according to the third exemplary embodiment, a wireless tag according to a fourth exemplary embodiment is an example of the preferred wireless tags to be attached onto the CDs without the second metal section. FIG. 10 illustrate the structure of the wireless tag. As illustrated in FIG. 10, the conductive plate 10 of the wireless tag of the present exemplary embodiment has a rectangular shape for partially overlapping the first metal section of a CD. Typically, the conductive plate 10 has a square shape.

Similarly to the third exemplary embodiment, for instance, the amount of Ag paste to be used for the conductive plate 10 of the wireless tag of the present exemplary embodiment becomes less than the conductive plate 10 formed in an annular shape for allowing the outer rim thereof to entirely overlap the first metal section of a CD.

(5) Fifth Exemplary Embodiment

Similarly to the wireless tags according to the third and fourth exemplary embodiments, a wireless tag of a fifth exemplary embodiment is an example of the preferred wireless tags to be attached onto the CDs without the second metal section. FIG. 11 illustrates the structure of the wireless tag of the fifth exemplary embodiment. The wireless tag illustrated in FIG. 11 is different from the wireless tags of the third and fourth exemplary embodiments in that the conductive plate 10 has an annular shape and the entire outer rim thereof is circumferentially overlapped with the first metal section of a CD. Further, the annular conductive plate 10 includes a single or plurality of holes in a region thereof disposed radially outwards of the slot 11. The shape and the number of holes may be herein arbitrarily set as long as the slot 11 communicates with the overlapped region of the conductive plate 10 with the first metal section. According to the present exemplary embodiment, the bored structure of the conductive plate 10 achieves reduction in amount of Ag paste to be used for the conductive plate under the condition that the conductive plate 10 has an annular shape for allowing the entire outer rim thereof to circumferentially overlap the first metal section of a CD.

(6) Sixth Exemplary Embodiment

In the wireless tag according to the first exemplary embodiment, the conductive plate 10 has the outer diameter set for overlapping the second metal section of a CD in order to cause electromagnetic coupling between the conductive plate 10 and the CD when the wireless tag of the first exemplary embodiment is attached onto the CD. Therefore, when the wireless tag of the first exemplary embodiment is attached onto a CD without the second metal section, the conductive plate 10 does not overlap the first metal section having an inner diameter greater than the inner diameter of the second metal section. Therefore, electromagnetic coupling is prevented between the conductive plate 10 and the first metal section. It may be herein plausible to prepare wireless tag of two types (e.g., the wireless tag of the first exemplary embodiment and the wireless tag of the third exemplary embodiment) depending on types of the CDs (i.e., the CDs with the second metal section or the CDs without the second metal section). The wireless tags of two types may be selectively attached onto a CD in accordance with the type of the CD. However, this is complicated. Further, preparation of the wireless tags of two types results in high cost.

Figure 12:
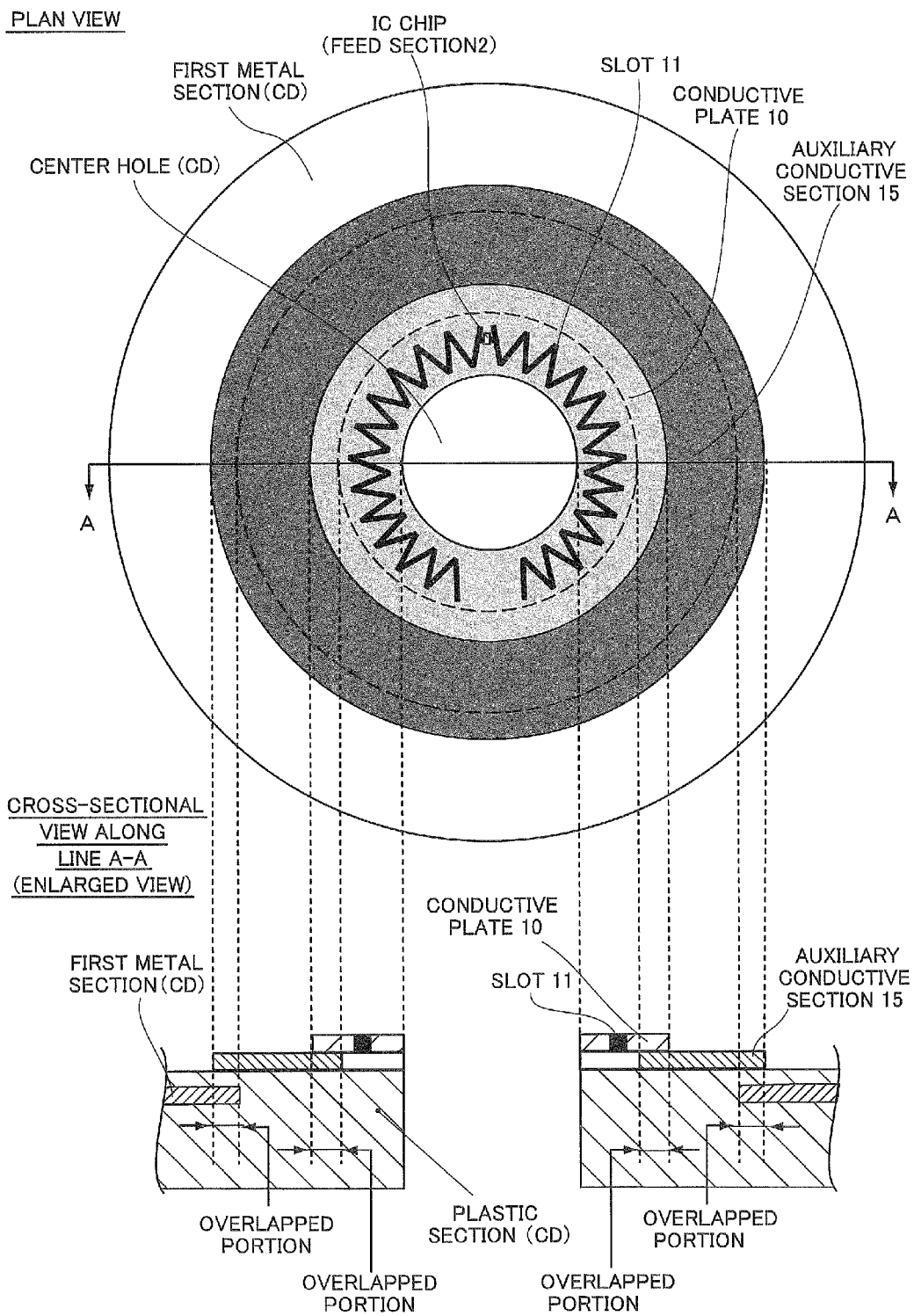
FIG. 12 is a plan view of an exemplary structure of a wireless tag in relation to a dimension of a CD, together with a cross-sectional view of the exemplary structure of the wireless tag according to the sixth exemplary embodiment in relation to the dimension of the CD, sectioned along a line A-A.

In view of the above, an auxiliary conductive section 15 is provided as an individual component separate from the conductive plate 10 (main conductive section) in the wireless tag of the present exemplary embodiment as described in FIG. 12. In the wireless tag of the present exemplary embodiment, for instance, the auxiliary conductive section 15 is provided as an individual component to the wireless tag of the first exemplary embodiment. Further, the auxiliary conductive section 15 is an annular conductive plate configured to enclose the conductive plate 10 when the wireless tag of the present exemplary embodiment is attached onto a CD. More specifically, the auxiliary conductive section 15 is formed for overlapping the outer rim of the conductive plate 10 of the first exemplary embodiment and simultaneously overlapping the inner rim of the first metal section of the CD when the wireless tag of the present exemplary embodiment is attached onto a CD. Accordingly, the conductive region of the conductive plate 10 is substantially expanded.

The conductive plate 10 and the auxiliary conductive section 15 may be herein insulated on the CD. For example, the conductive plate 10 and the auxiliary conductive section 15 may be respectively wrapped by vinyl material and the like while being prevented from directly making contact with each other in their overlapped portions.

For example, the auxiliary conductive section 15 may have an inner diameter of ø26 and an outer diameter of ø42, where the dimension of the wireless tag of the first exemplary embodiment in FIG. 5 and dimension of a CD including the first metal section with an inner diameter of ø40 are herein assumed.

The wireless tag of the sixth exemplary embodiment is used as described below. For example, the wireless tag of the first exemplary embodiment is configured to be attached onto a CD with the second metal section, whereas the wireless tag of the present exemplary embodiment is configured to be attached onto a CD without the second metal section. In this case, the wireless tag of the present exemplary embodiment is attached onto a CD by firstly attaching the auxiliary conductive section 15 onto the label surface of the CD and subsequently attaching the wireless tag of the first exemplary embodiment thereon. Simply put, the wireless tag of a single type (e.g., the wireless tag of the first exemplary embodiment) is prepared, and it is allowed to select whether or not the auxiliary conductive section 15 is added for appropriately setting the wireless tag depending on types of the CDs (i.e., a CD with the second metal section or a CD without the second metal section). Further cost reduction is achieved compared to preparation of the wireless tags of two types.

The wireless tag of the first exemplary embodiment is herein assumed as a wireless tag functioning as the basis of the wireless tag of the present exemplary embodiment, i.e., the wireless tag without addition of the auxiliary conductive section 15. However, the wireless tag, as the basis of the wireless tag of the present exemplary embodiment, is not limited to the above. Any suitable wireless tags may be used as the wireless tag functioning as the basis of the wireless tag of the present exemplary embodiment as long as the structure and the shape thereof are suitable for a CD without the second metal section. For example, the wireless tag of the second exemplary embodiment may be used as the basis of the wireless tag of the present exemplary embodiment. In this case, the aforementioned θ is adjusted as needed.

(7) Seventh Exemplary Embodiment

Figure 13:
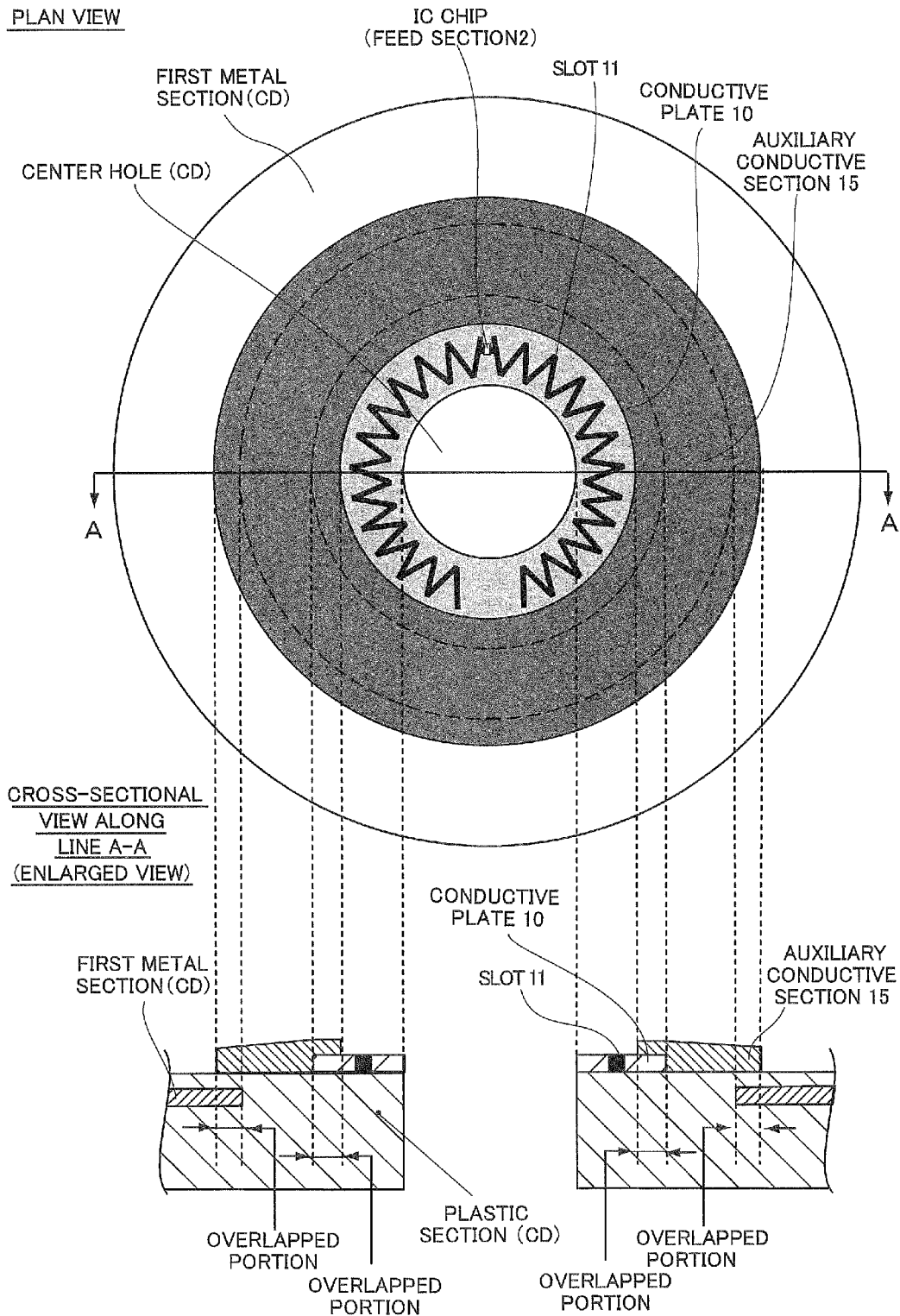
FIG. 13 is a plan view of an exemplary structure of a wireless tag in relation to a dimension of a CD, together with a cross-sectional view of the exemplary structure of the wireless tag according to the seventh exemplary embodiment in relation to the dimension of the CD, sectioned along a line A-A.

A wireless tag according to a seventh exemplary embodiment is formed based on the same point of view as the wireless tag according to the sixth exemplary embodiment. Further, the wireless tag of the present exemplary embodiment is different from the wireless tag of the sixth exemplary embodiment regarding the shape of the auxiliary conductive section 15. FIG. 13 illustrates the structure of the wireless tag of the present exemplary embodiment. As illustrated in FIG. 13, when being attached onto a CD, the wireless tag of the present exemplary embodiment is configured to: partially cover the top surface of the conductive plate 10 (main conductive section) of the first exemplary embodiment for overlapping the outer rim of the conductive plate 10 in a plan view; and simultaneously overlapping the inner rim of the first metal section of the CD in a plan view. Similarly to the wireless tag of the sixth exemplary embodiment, the wireless tag of the present exemplary embodiment is attached onto a CD without the second metal section. For example, the wireless tag of the present exemplary embodiment is herein attached onto a CD by firstly attaching the wireless tag of the first exemplary embodiment onto the label surface of the CD and subsequently attaching the auxiliary conductive section 15 illustrated in FIG. 13 thereon.

(8) Eighth Exemplary Embodiment

Magnitude of electromagnetic coupling varies depending on whether the outer diameter of the slot is less than or equal to the inner diameter of the metal section of a CD as an attachment target for the wireless tag (i.e., the wireless tag of the first exemplary embodiment) or greater than the inner diameter of the metal section of the CD (i.e., the wireless tag of the second exemplary embodiment). Read ranges of the wireless tags are thereby different from each other (see FIGS. 6A and 6B, and FIGS. 8A and 8B). Meanwhile, the research, conducted by the inventors of the present invention, confirmed existence of CDs including the second metal section with the inner diameter D4 of ø20-27 as described above. When the slot of the wireless tag has an outer diameter uniquely set to be in the range of ø20-27, there coexist CDs of one type including the second metal section overlapping the slot of the wireless tag and CDs of the other type including the second metal section without overlapping the slot of the wireless tag. Therefore, read range of the wireless tag varies depending on a type of CDs. In view of the above, an auxiliary conductive section is used in the wireless tag of the present exemplary embodiment for obtaining stable read range without depending on the inner diameter of the second metal section of a CD.

Figure 14:
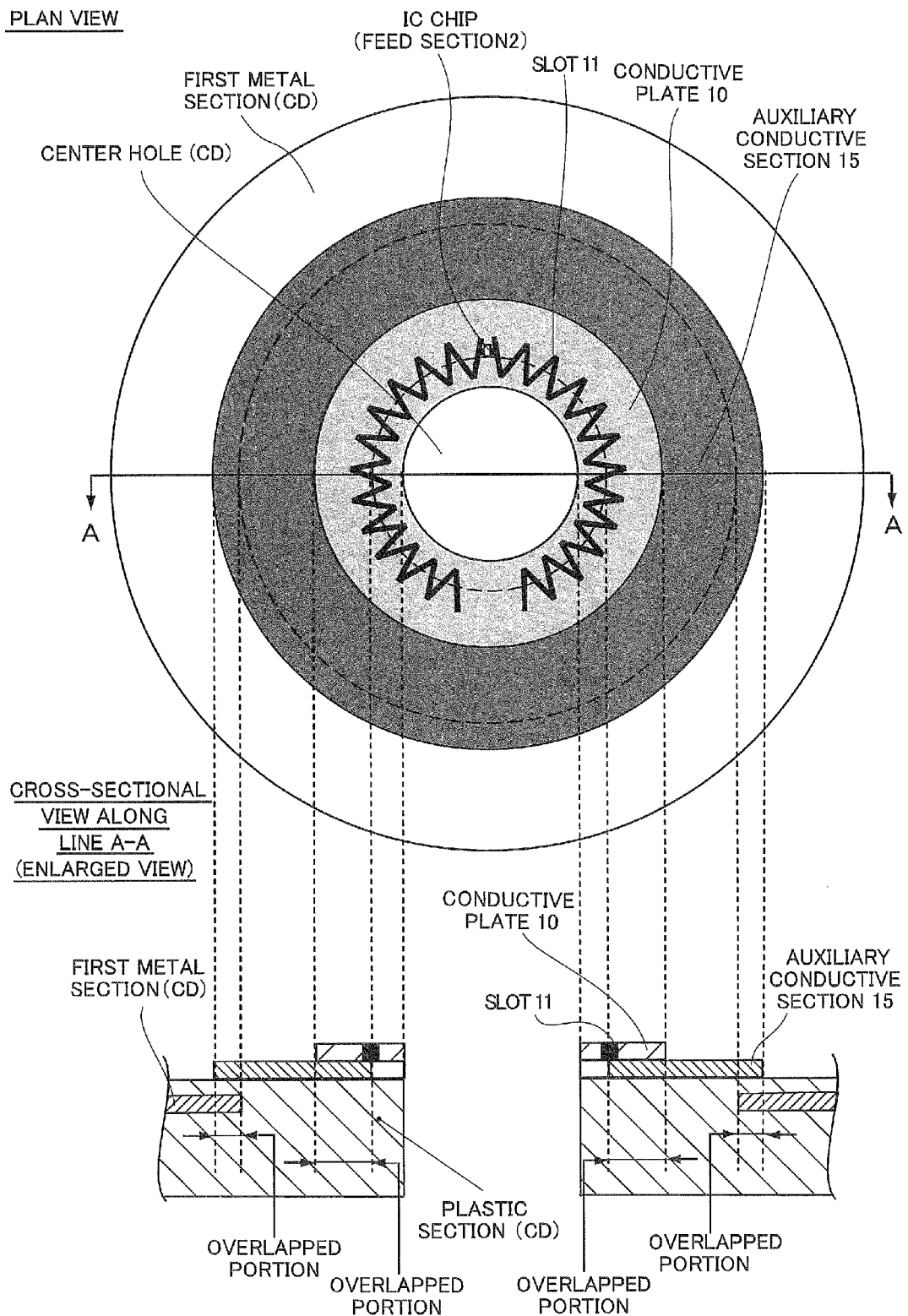
FIG. 14 is a plan view of an exemplary structure of a wireless tag in relation to a dimension of a CD, together with a cross-sectional view of the exemplary structure of the wireless tag according to the eighth exemplary embodiment in relation to the dimension of the CD, sectioned along a line A-A.

FIG. 14 illustrate the wireless tag of the present exemplary embodiment. The wireless tag of the present exemplary embodiment includes an auxiliary conductive section 15 similar to the auxiliary conductive section in the wireless tag of the sixth exemplary embodiment. However, the inner diameter of the auxiliary conductive section 15 in the present exemplary embodiment is different from that of the auxiliary conductive section in the sixth exemplary embodiment. In the present exemplary embodiment, the auxiliary conductive section 15 has an inner diameter set to be less than the outer diameter of the slot. Therefore, the slot of the wireless tag of the present exemplary embodiment is always configured to overlap the auxiliary conductive section 15 regardless of the inner diameter of the second metal section of a CD when the auxiliary conductive section 15 is attached onto the CD. On the other hand, the outer diameter of the auxiliary conductive section 15 is configured to overlap the inner rim of the first metal section of the CD, similarly to the sixth exemplary embodiment. Further, the shape of the slot (i.e., the angle θ in FIG. 7) is appropriately set for ensuring read range similarly to the second exemplary embodiment.

According to the wireless tag of the present exemplary embodiment, the auxiliary conductive section 15 is always configured to overlap the slot when the wireless tag is attached onto a CD regardless of a type of a CD (i.e., a CD with the second metal section or a CD without the second metal section, and dimension of the inner diameter of the second metal section if any), as described above. Therefore, read range of the wireless tag is stabilized without depending on a type of a CD by appropriately setting the shape of the slot (i.e., the angle θ in FIG. 7).

(9) Ninth Exemplary Embodiment

Figure 15:
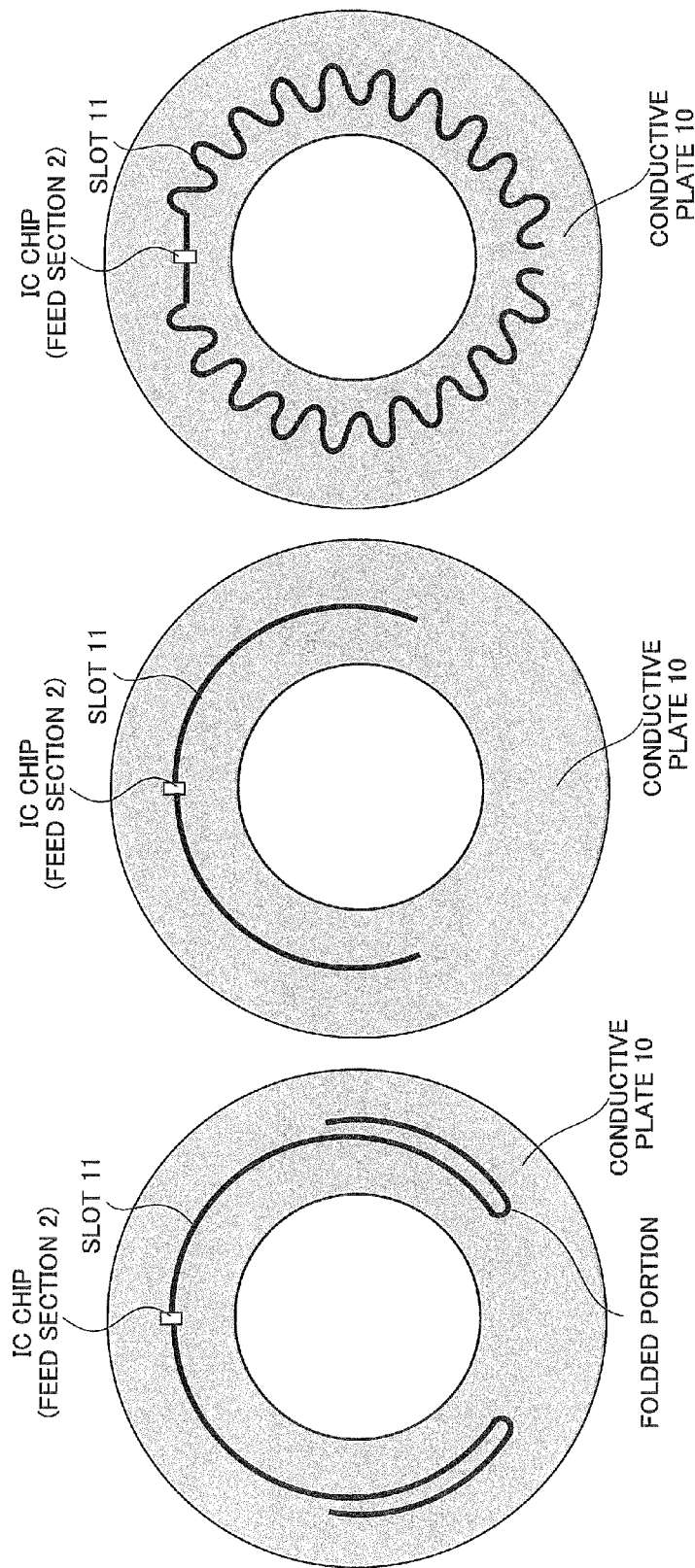
FIG. 15A is a diagram illustrating an exemplary structure of a slot antenna of a wireless tag according to a ninth exemplary embodiment.
FIG. 15B is a diagram illustrating another exemplary structure of the slot antenna of the wireless tag according to the ninth exemplary embodiment.
FIG. 15C is a diagram illustrating yet another exemplary structure of the slot antenna of the wireless tag according to the ninth exemplary embodiment.

The first to eighth exemplary embodiments have explained the wireless tags including the slot 11 entirely formed in a circular-arc meander shape. However, the shape of the slot 11 is not limited to the above. FIGS. 15A, 15B and 15C illustrate a variety of modifications of the shape of the slot 11 in a wireless tag according to a ninth exemplary embodiment.

The slot 11 illustrated in FIG. 15A is extended from the feed section 2 to the both lateral sides thereof. The slot 11 is entirely formed in a circular-arc but non-meander shape. Specifically, the slot 11 illustrated in FIG. 15A is entirely formed in an accurate circular-arc shape. However, the slot 11 may be formed in a somehow meandering shape. As illustrated in FIG. 15A, the slot 11 may be provided with folded portions for adjusting the entire length thereof in order to ensure a predetermined inductance by the entire length of the slot 11.

The slot 11 illustrated in FIG. 15B is shaped for using a wireless frequency of 2.45 GHz. In this case, wavelength is shorter than that at a wireless frequency of 953 MHz. Therefore, the slot 11 may not be formed in a meander shape.

Similarly to the aforementioned exemplary embodiments, the slot 11 illustrated in FIG. 15C is also formed in a meander shape. However, the slot 11 is formed in a meander shape by coupling a plurality of random-shaped (roughly U-shaped) portions in a circular-arc shape. The following is the reason that random-shaped (roughly U-shaped) portions are herein used. Electricity flows in opposite directions on a part of the conductive plate 10 disposed outwards of adjacent roughly U-shaped portions of the slot 11. However, electricity vectors in opposite directions are not completely parallel to each other. It is thereby possible to reduce the amount of electromagnetic waves to be cancelled by electricity flowing in opposite directions. It is consequently possible to further increase the effective length of an antenna compared to, for instance, a meander-shaped slot 11 formed by coupling exact (i.e., non-random) U-shaped portions. The slot 11 is thereby allowed to have a small outer diameter.

(10) Tenth Exemplary Embodiment

The first to ninth exemplary embodiments have been explained under the premise that the wireless tag is attached onto a disc-shaped recording medium. However, an attachment target of the wireless tag is not limited to the above. For example, the wireless tag is allowed to be applied to a target member including: a first region disposed on the inner part thereof while being separated from a non-conductive member; and a second region disposed on the outer part thereof while being disposed close to a conductive member. For example, a recessed metal member (e.g., arms or frames for vehicles) is a typical example of the aforementioned target member. The metal member is herein preliminarily recessed for purposes such as a weight reduction. The wireless tag of the present exemplary embodiment is allowed to be attached onto the recess. In this case, the recess corresponds to the first region, whereas the surrounding region of the recess corresponds to the second region. It is herein apparent that the wireless tag is allowed to be attached onto the recess formed on the metal member for a weight reduction purpose or the recess preliminarily formed on a part of the metal member without negatively impacting its functions.

FIG. 16 illustrate the wireless tag of the present exemplary embodiment attached onto the metal member. The wireless tag of the present exemplary embodiment corresponds to a disc-shaped wireless tag formed by, for instance, filling the center opening of the conductive plate of the wireless tag of the first exemplary embodiment. The conductive plate and the meander-shaped slot, forming the slot antenna, have dimensions optimized in accordance with the shape of the metal member of an attachment target in order to obtain inductance enough to cause resonance with the IC chip at a predetermined wireless frequency.

In FIG. 16, a cylindrical recess is formed in the metal member. The entirely circular flat-plate wireless tag of the present exemplary embodiment is attached onto the metal member for covering the recess from the above. Therefore, the wireless tag of the present exemplary embodiment has an outer diameter greater than the diameter of the recess of the metal member as an attachment target. The method of attaching the wireless tag onto the metal member is not herein particularly limited. For example, the extremely thin double-sided adhesive tapes, adhesive materials, stickers and the like may be used for the attachment of the wireless tag. The meander-shaped slot preferably has an outer diameter less than the diameter of the recess of the metal member. Similarly to the aforementioned exemplary embodiments, the meander-shaped slot antenna is also herein applied for reducing the outer diameter of the wireless tag as much as possible.

The overlapped portion of the metal member, illustrated in FIG. 16, functions as not only a portion for attaching the wireless tag thereon but also a portion electromagnetically coupled to the conductive plate forming the slot antenna of the wireless tag. In other words, the overlap structure results in occurrence of electromagnetic coupling between the metal member and the conductive plate of the wireless tag at a high frequency band. Accordingly, the metal member is allowed to function as a part of the conductive plate, and sufficient electromagnetic waves are emitted from the slot. Meanwhile, the recess of the metal member is disposed under the slot when the wireless tag is attached onto the metal member. Accordingly, blockage of the electromagnetic waves emitted from the slot antenna is prevented. Therefore, the wireless tag of the present exemplary embodiment ensures sufficient read range from the reader/writer (not illustrated in the figure), although being compactly formed.

The aforementioned case relates to the wireless tag of the present exemplary embodiment to be attached onto the metal member as a target member. It is apparent that the wireless tag is allowed to be applied not only to the metal member as a target member but also a conductive member including a recess, hollow, or opening of a predetermined dimension. For example, the wireless tag illustrated in FIG. 16 is formed as a circular wireless tag (i.e., a circular conductive plate) for fitting to the cylindrical recess of the metal member. However, the shape of the wireless tag is not limited to the above. The entire shape of the wireless tag may be optimized with respect to the shape of a target member. For example, when the recess of a target member has a cube shape, the wireless tag may have an entirely rectangular shape.

Further, it is apparent that the wireless tags of the first to ninth exemplary embodiments is allowed to be applied to the wireless tag of the tenth exemplary embodiment as needed. For example, when the wireless tag is attached onto the inner part of the metal member, the slot is preferably formed to be entirely contained in the first region of the metal member (i.e., the recess). Further, the wireless tag of a single type is compatible to a plurality of metal members including different-sized recesses when an auxiliary conductive section, configured to overlap the outer rim of the conductive plate, is further provided for expanding a conductive region of the conductive plate.

(11) Eleventh Exemplary Embodiment

The aforementioned third exemplary embodiment (see FIG. 9) has exemplified the case that the conductive plate 10 includes four extended portions 101 for overlapping the first metal section of a CD when the wireless tag is attached onto the CD without the second metal section. The following eleventh exemplary embodiment explains a more preferable example of the wireless tag according to the third exemplary embodiment.

Figure 17:
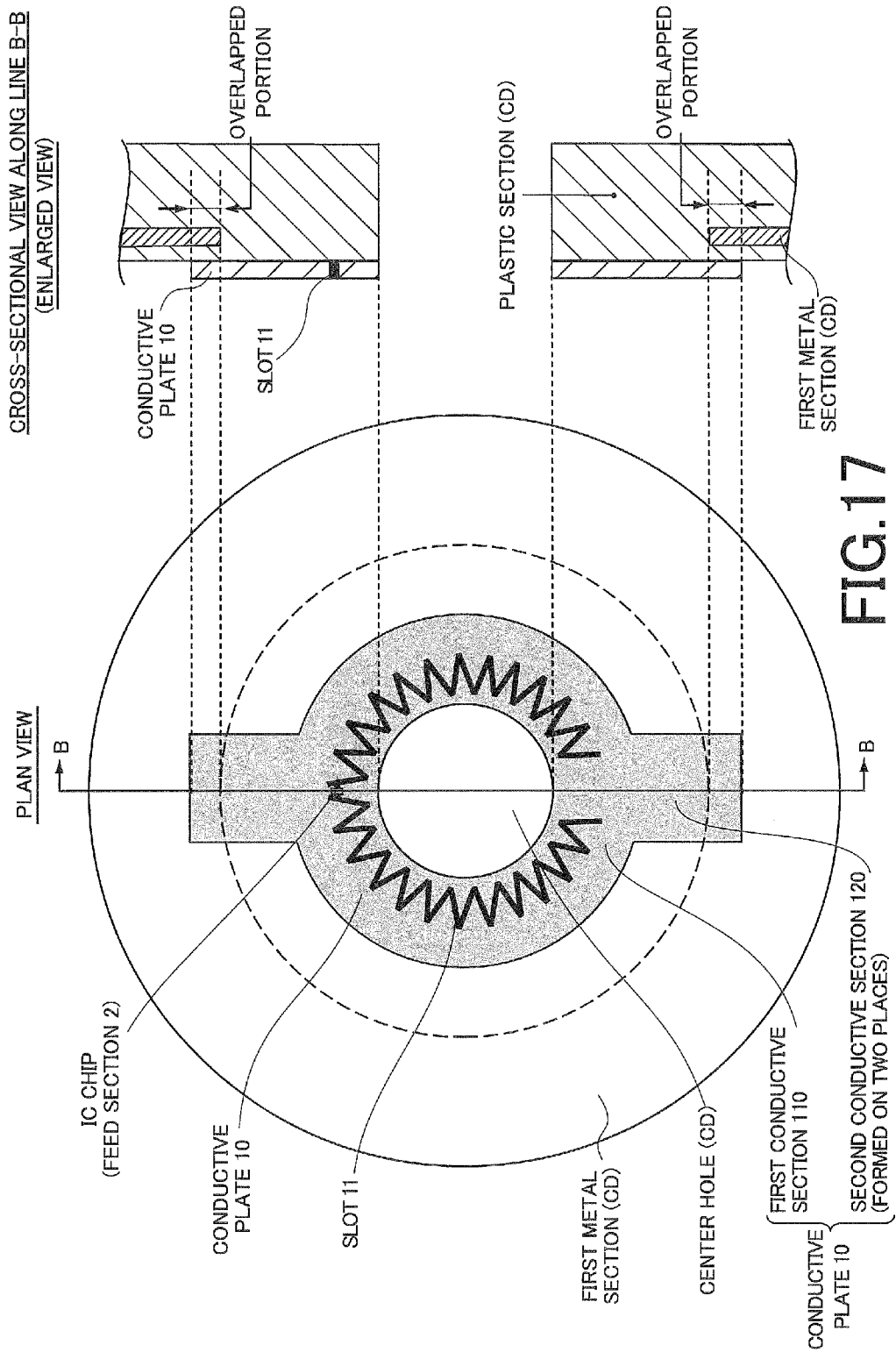
FIG. 17 is a plan view of an exemplary structure of a wireless tag in relation to a dimension of a CD, together with a cross-sectional view of the exemplary structure of the wireless tag according to the eleventh exemplary embodiment in relation to the dimension of the CD, sectioned along a line B-B.

FIG. 17 illustrates the wireless tag according to the eleventh exemplary embodiment. Specifically, FIG. 17 illustrates the wireless tag of the eleventh exemplary embodiment attached onto a CD without the second metal section. As illustrated in FIG. 17, the conductive plate 10 of the wireless tag of the present exemplary embodiment includes a first conductive section 110 and two second conductive sections 120 (corresponding to the extended portions 101 in the third exemplary embodiment). The first conductive section 110 includes a slot 11 therein. The first conductive section 110 is an annular conductive member having an outer diameter less than the inner diameter of the first metal section (i.e., the second region) of the CD. The second conductive sections 120 are conductive members formed for overlapping the first metal section of the CD. The second conductive sections 120 are extended from the first conductive section 110 towards the outer rim of the CD in two opposite directions along a hypothetical line connecting the feed section 2 and the center of the CD (i.e., a line B-B).

When the wireless tag of the present exemplary embodiment is attached onto the CD, a non-conductive section is circumferentially formed between the first conductive section 110 of the conductive plate 10 and the first metal section of the CD in a plan view. Therefore, dipole antennas are formed at two positions where the second conductive sections 120 and the first metal section of the CD overlap with each other. Simultaneously, electromagnetic coupling occurs between the wireless tag and the entire first metal section of the CD overlapping the second conductive sections 120. Electromagnetic waves are thereby emitted. In other words, the conductive plate 10, arranged along the hypothetical line connecting the feed section 2 and the center of the CD, has an entire length of roughly 52 mm, for instance, in the present exemplary embodiment. When the CD (having an outer diameter of 0120) is allowed to entirely operate through the overlapped portions, however, the read ranges of the dipole antennas will be closer to $\lambda/2$ (roughly 150 mm) at a frequency of 952-954 MHz used for the RFID systems in Japan. Therefore, it is possible to further extend read range compared to a case that only the slot 11 operates as a slot antenna. The area of the conductive plate 10 is further reduced than the case of the third exemplary embodiment (see FIG. 9). This contributes to cost reduction. The aforementioned dipole antennas are not formed and only the slot antenna operates in a CD of the type that the second metal section is disposed radially inwards of the first metal section while overlapping the conductive plate 10 in a plan view.

Example settings of preferable dimensions in the present exemplary embodiment are as follows. The width of the second conductive section 120 is preferably set to be 10 mm. The length of the second conductive section 120 disposed along the line B-B is preferably set to be 12-13 mm. The overlap amount between each second conductive section 120 and the first metal section of the CD is preferably set to be 4 mm.

(12) Twelfth Exemplary Embodiment

Next, a wireless tag according to a twelfth exemplary embodiment will be explained with reference to FIG. 18.

Figure 18:
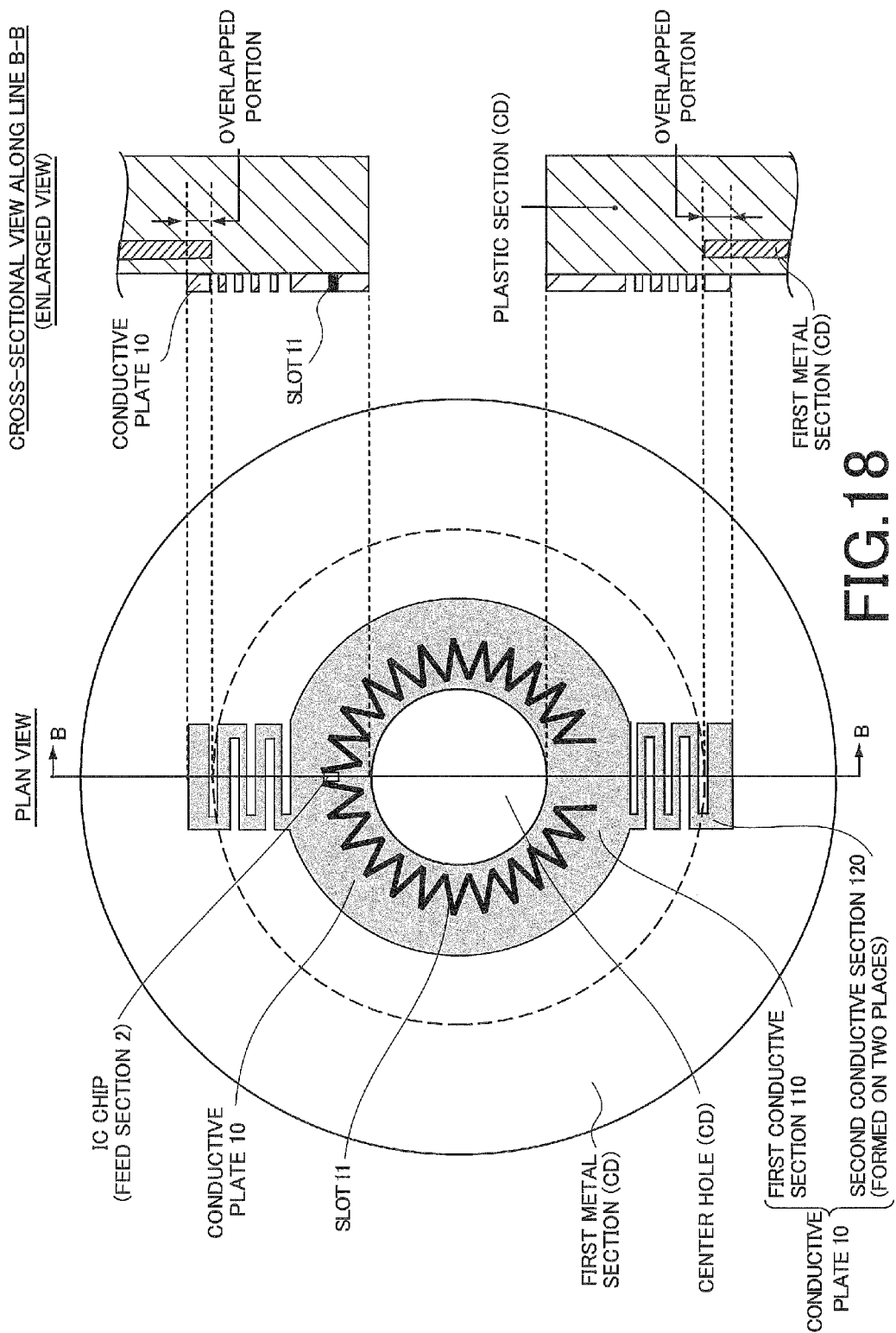
FIG. 18 is a plan view of an exemplary structure of a wireless tag in relation to a dimension of a CD, together with a cross-sectional view of the exemplary structure of the wireless tag according to the twelfth exemplary embodiment in relation to the dimension of the CD, sectioned along a line B-B.

As illustrated in FIG. 18, the wireless tag according to the present exemplary embodiment is different from the wireless tag according to the eleventh exemplary embodiment in that two second conductive sections 120, ranging from the first conductive section 110 to the first metal section of a CD, has a meander shape. Accordingly, the second conductive sections 120 will be substantially further extended. It is thereby possible to further enhance actions as dipole antennas described in the eleventh exemplary embodiment. As described above, $\lambda/2$ corresponds to roughly 150 mm when the wireless tag is used for the RFID systems in Japan. However, the meander-shaped second conductive section 120 enables the entire length of the dipole antenna formed by the conductive plate 10 to be extended close to 150 mm. In the eleventh exemplary embodiment, for instance, the conductive plate 10, disposed along the hypothetical line connecting the feed section 2 and the center of a CD, has an entire length of roughly 52 mm. In the present exemplary embodiment, in contrast, it is possible to set the entire length of the conductive plate 10 to be roughly 130 mm (the effective length is 110-120 mm) when each meander-shaped portion has a line width of 1 mm. Accordingly, the entire length of the conductive plate 10 will be close to the aforementioned $\lambda/2$.

As described above, the entire length of the conductive plate 10 will be close to the aforementioned $\lambda/2$. Therefore, it is possible to use the wireless tag of the present exemplary embodiment independently, i.e., without considering electromagnetic coupling with the first metal section of a CD. For example, the wireless tag of the present exemplary embodiment is allowed to be attached onto a plastic casing of a VHS tape without a conductive section, a book, and the like.

In the wireless tag of the present exemplary embodiment, each of the second conductive sections 120 has a meander-shaped portion ranging from the first conductive section 110 to the first metal section of a CD. However, a portion of each second conductive section 120, overlapping the first metal section of the CD, preferably has a non-meander shape. This is because the entire length of the wireless tag is inevitably increased for keeping an electromagnetic coupling performance similar to the eleventh exemplary embodiment, i.e., for ensuring the substantial overlap amount when the overlapped portion of each second conductive section 120 with the first metal section also has a meander shape.

(13) Thirteenth Exemplary Embodiment

Next, a wireless tag according to a thirteenth exemplary embodiment will be explained with reference to FIG. 19.

Figure 19:
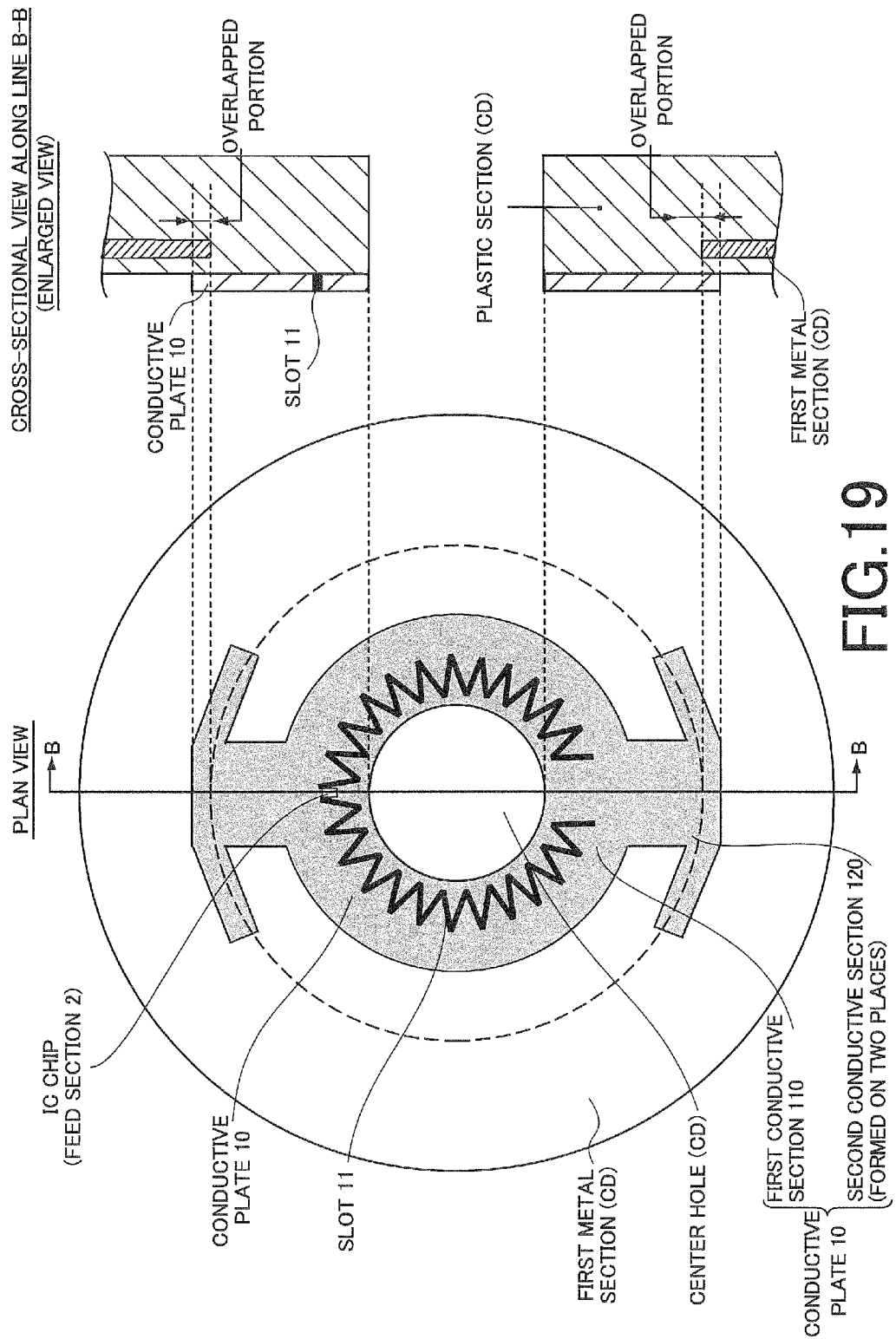
FIG. 19 is a plan view of an exemplary structure of a wireless tag in relation to a dimension of a CD, together with a cross-sectional view of the exemplary structure of the wireless tag according to the thirteenth exemplary embodiment in relation to the dimension of the CD, sectioned along a line B-B.

As illustrated in FIG. 19, the wireless tag according to the present exemplary embodiment is different from the wireless tag according to the eleventh exemplary embodiment in that a portion of each second conductive section 120, overlapping a first metal section of a CD, is extended along the inner circumference of the first metal section. To compactly form the entire wireless tag, each overlapped portion is thus extended along the inner circumference of the first metal section. Similarly to the twelfth exemplary embodiment, each second conductive section 120 will be substantially further extended due to the aforementioned shape thereof. It is consequently possible to further enhance actions as dipole antennas described in the eleventh exemplary embodiment.

The wireless tag according to the present exemplary embodiment is based on the same concept as the twelfth exemplary embodiment, i.e., the intention of ensuring a sufficient length for each second conductive section 120. However, each second conductive section 120 has a non-meander shape unlike the twelfth exemplary embodiment. Therefore, the wireless tag of the present exemplary embodiment has an advantage in a communication performance. Specifically, when each second conductive section 120 is molded in a meander shape as seen in the twelfth exemplary embodiment, electric loss may occur due to roughly opposite current directions at a roughly V-shaped portion of the meander-shaped second conductive section 120. In contrast, such a loss does not occur in the present exemplary embodiment. Therefore, the read range of the wireless tag according to the present exemplary embodiment will be further extended than that of the wireless tag according to the twelfth exemplary embodiment.

In the wireless tag of the present exemplary embodiment, the portions of the second conductive sections 120, overlapping the first metal section of a CD, are allowed to be extended along the inner circumference of the first metal section to an extent that the conductive plate 10 has an effective length of $\lambda/2$ for appropriately functioning as dipole antennas. In this regard, the wireless tag of the present exemplary embodiment has less constraint for its designation than the wireless stag having the meander-shaped second conductive sections 120 according to the twelfth exemplary embodiment.

(14) Fourteenth Exemplary Embodiment

Next, a wireless tag according to a fourteenth exemplary embodiment will be explained with reference to FIG. 20.

Figure 20:
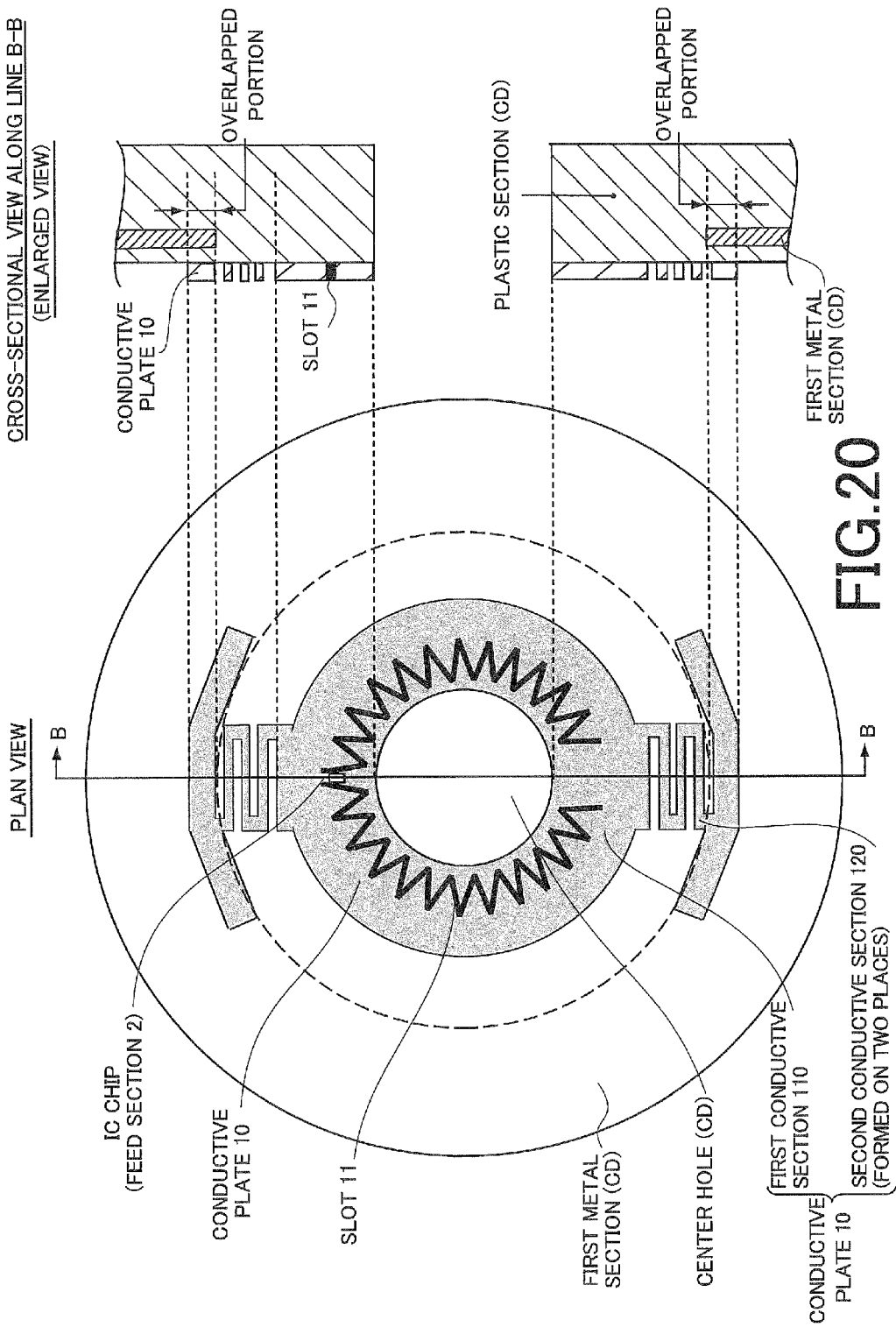
FIG. 20 is a plan view of an exemplary structure of a wireless tag in relation to a dimension of a CD, together with a cross-sectional view of the exemplary structure of the wireless tag according to the fourteenth exemplary embodiment in relation to the dimension of the CD, sectioned along a line B-B.

As illustrated in FIG. 20, the wireless tag of the present exemplary embodiment has both of the features of the wireless tags of the twelfth and thirteenth exemplary embodiments. Specifically, the wireless tag of the present exemplary embodiment is structured as follows. A portion of each second conductive section 120, ranging from the first conductive section 110 to the first metal section of a CD, has a meander shape. Further, a portion of each second conductive section 120, overlapping the first metal section of the CD, is extended along the inner circumference of the first metal section. The wireless tag of the present exemplary embodiment may be regarded as an improved type of the wireless tag of the twelfth exemplary embodiment. Simply put, the meander-shaped portion in the wireless tag of the present exemplary embodiment has a length less than that of the meander-shaped portion in the wireless tag of the twelfth exemplary embodiment. This is because the portion of each second conductive section, overlapping the first metal section of the CD, is extended along the inner circumference of the first metal section for allowing the conductive plate 10 to have an effective length enabling it to appropriately operate as dipole antennas. It is consequently possible to reduce the number of folding times for forming the meander-shaped portion compared to the case described in the twelfth exemplary embodiment. Electric loss is thereby inhibited in the meander-shaped portions.

A plurality of exemplary embodiments of the present invention have been explained in detail. However, the wireless tag of the present invention is not limited to the aforementioned exemplary embodiments. It will be apparent that various changes and modifications can be made for the wireless tags of the aforementioned exemplary embodiments without departing from the scope of the present invention. For example, the CDs have been mainly described as an attachment targets for the wireless tag in the aforementioned exemplary embodiments. However, it would be apparent for those skilled in the art that the wireless tag of the present invention can be arbitrarily optimized depending on other products structured similarly to the CDs such as the DVDs (Digital Versatile Discs) and the BDs (Blu-ray Discs: Registered trademark).

All examples and conditional languages recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alternations could be made hereto without departing from the spirit and scope of the invention.

What is claimed is:

1. A wireless tag configured to be attached onto a disc-shaped recording medium including a first region and a second region, the first region made of a nonconductive member, the first region disposed on an inner radial part of the recording medium, the second region including a conductive member, the second region disposed on an outer radial part of the recording medium, comprising:

a feed section configured to be connected to a wireless IC chip; and a slot antenna configured to receive power from the feed section, the slot antenna including a conductive plate having a slot, wherein the conductive plate is formed for at least partially overlapping the second region of the recording medium when the wireless tag is attached onto the inner radial part of the recording medium, the slot has a length set for obtaining an inductance enough to cause resonance between the slot antenna and the wireless IC chip at a predetermined wireless frequency, and the slot extends from opposing sides of the feed section to respective ends of the slot.

2. The wireless tag recited in claim 1, wherein the slot is configured to be entirely enclosed within the first region of the recording medium when the wireless tag is attached onto the inner radial part of the recording medium.

3. A wireless tag configured to be attached onto a disc-shaped recording medium including a first region and a second region, the first region made of a nonconductive member, the first region disposed on an inner radial part of the recording medium, the second region including a conductive member, the second region disposed on an outer radial part of the recording medium, comprising:
   a feed section configured to be connected to a wireless IC chip; and
   a slot antenna configured to receive power from the feed section, the slot antenna including a conductive plate having a slot,
   wherein the conductive plate is formed for at least partially overlapping the second region of the recording medium when the wireless tag is attached onto the inner radial part of the recording medium, and
   the slot has a length set for obtaining an inductance enough to cause resonance between the slot antenna and the wireless IC chip at a predetermined wireless frequency, wherein the slot is extended from the feed section to both lateral sides of the feed section while having an entirely circular-arc meander shape.

4. A wireless tag configured to be attached onto a disc-shaped recording medium including a first region and a second region, the first region made of a nonconductive member, the first region disposed on an inner radial part of the recording medium, the second region including a conductive member, the second region disposed on an outer radial part of the recording medium, comprising:
   a feed section configured to be connected to a wireless IC chip; and
   a slot antenna configured to receive power from the feed section, the slot antenna including a conductive plate having a slot,
   wherein the conductive plate is formed for at least partially overlapping the second region of the recording medium when the wireless tag is attached onto the inner radial part of the recording medium, and
   the slot has a length set for obtaining an inductance enough to cause resonance between the slot antenna and the wireless IC chip at a predetermined wireless frequency, wherein the slot is extended from the feed section to both lateral sides of the feed section while having an entirely circular-arc non-meander shape.

5. The wireless tag recited in claim 4, wherein the slot includes a folded portion for adjusting a length thereof.

6. A wireless tag configured to be attached onto a disc-shaped recording medium including a first region and a second region, the first region made of a nonconductive member, the first region disposed on an inner radial part of the recording medium, the second region including a conductive member, the second region disposed on an outer radial part of the recording medium, comprising:
   a feed section configured to be connected to a wireless IC chip; and
   a slot antenna configured to receive power from the feed section, the slot antenna including a conductive plate having a slot,
   wherein the conductive plate is formed for at least partially overlapping the second region of the recording medium when the wireless tag is attached onto the inner radial part of the recording medium, and
   the slot has a length set for obtaining an inductance enough to cause resonance between the slot antenna and the wireless IC chip at a predetermined wireless frequency, wherein the conductive plate includes:
   an annular-shaped main conductive section including the slot; and
   an annular-shaped auxiliary conductive section overlapping a main body of the conductive plate with an inner radial part thereof, the auxiliary conductive portion overlapping the second region of the recording medium with an outer radial part thereof.

7. A wireless tag configured to be attached onto a disc-shaped recording medium including a first region and a second region, the first region made of a nonconductive member, the first region disposed on an inner radial part of the recording medium, the second region including a conductive member, the second region disposed on an outer radial part of the recording medium, comprising:
   a feed section configured to be connected to a wireless IC chip; and
   a slot antenna configured to receive power from the feed section, the slot antenna including a conductive plate having a slot,
   wherein the conductive plate is formed for at least partially overlapping the second region of the recording medium when the wireless tag is attached onto the inner radial part of the recording medium, and
   the slot has a length set for obtaining an inductance enough to cause resonance between the slot antenna and the wireless IC chip at a predetermined wireless frequency, the conductive plate includes:
   an annular-shaped first conductive section including the slot, the first conductive section having an outer diameter less than an inner diameter of the second region of the recording medium; and
   second conductive sections extended from the first conductive section towards an outer rim of the recording medium in two opposite directions along a hypothetical line connecting the power supply contact and a center of the recording medium, the second conductive sections overlapping the second region.

8. The wireless tag recited in claim 7, wherein each second conductive section includes a meander-shaped portion disposed between the first conductive section and the second region.

9. The wireless tag recited in claim 7, wherein the portions of the second conductive sections, overlapping the second region, are extended along an inner circumference of the second region.

* * * * *